United States Patent
Lawler et al.

(10) Patent No.: US 12,430,226 B2
(45) Date of Patent: Sep. 30, 2025

(54) SYSTEMS AND METHODS FOR INTELLIGENT INTERROGATION AND TAGGING OF A CODEBASE

(71) Applicant: AppLand Inc., Weston, MA (US)

(72) Inventors: Elizabeth Lawler, Weston, MA (US); Kevin Gilpin, Weston, MA (US)

(73) Assignee: AppLand Inc., Weston, MA (US)

( * ) Notice: Subject to any disclaimer, the term of this patent is extended or adjusted under 35 U.S.C. 154(b) by 279 days.

(21) Appl. No.: 18/356,424

(22) Filed: Jul. 21, 2023

(65) Prior Publication Data

US 2025/0028625 A1 Jan. 23, 2025

(51) Int. Cl.
*G06F 11/3604* (2025.01)
*G06F 11/3668* (2025.01)
*G06F 11/3698* (2025.01)

(52) U.S. Cl.
CPC ...... *G06F 11/3608* (2013.01); *G06F 11/3688* (2013.01); *G06F 11/3698* (2025.01)

(58) Field of Classification Search
None
See application file for complete search history.

(56) References Cited

U.S. PATENT DOCUMENTS

| | | |
|---|---|---|
| 5,581,797 A | 12/1996 | Baker et al. |
| 6,633,878 B1 | 10/2003 | Underwood |
| 8,041,554 B1 | 10/2011 | Limondin et al. |
| 8,549,353 B2 | 10/2013 | Thomson et al. |
| 8,780,114 B1 | 7/2014 | Jackey et al. |
| 8,782,614 B2 | 7/2014 | Basak et al. |
| 9,020,939 B2 | 4/2015 | Brodsky et al. |
| 9,047,399 B2 | 6/2015 | Grunberg et al. |
| 10,318,251 B1 | 6/2019 | Darnell et al. |
| 10,459,819 B2 | 10/2019 | Chen et al. |
| 11,063,849 B1 | 7/2021 | Clegg et al. |
| 11,252,079 B2 | 2/2022 | Michael et al. |
| 11,256,604 B2 | 2/2022 | Agarwal et al. |
| 11,307,847 B1 * | 4/2022 | Yim .................. G06F 8/33 |
| 2002/0188616 A1 | 12/2002 | Chinnici et al. |
| 2003/0093792 A1 | 5/2003 | Labeeb et al. |

(Continued)

OTHER PUBLICATIONS

Andersen, et al., "Adding Interactive Visual Syntax to Textual Code," ACM, 2020. (Year: 2020).*

(Continued)

*Primary Examiner* — Ryan D. Coyer

(57) ABSTRACT

Systems, methods, and devices are provided to intelligently interrogate and tag a codebase. A behavioral model of the codebase is accessed that represents a run-time behavior of the codebase. The behavioral model and codebase are interrogated to identify locations for placing bidirectional tags within the behavioral model and the codebase. The bidirectional tags include links for connecting portions of the behavioral model to corresponding lines of code within the codebase. Selection of a bidirectional tag of the behavioral model causes focus of a user interface to change from a view of a visual depiction of the behavioral model to a view of a corresponding tag in the codebase. Selection of a bidirectional tag of the codebase causes focus of the user interface to change from a view of the codebase to a view of a corresponding tag in the visual depiction of the behavioral model.

20 Claims, 12 Drawing Sheets

(56) References Cited

U.S. PATENT DOCUMENTS

| | | |
|---|---|---|
| 2004/0031030 A1 | 2/2004 | Kidder et al. |
| 2007/0169011 A1 | 7/2007 | Ramani et al. |
| 2009/0018879 A1 | 1/2009 | Flaxer et al. |
| 2009/0064001 A1* | 3/2009 | Robbins ............... G06F 3/0481 715/762 |
| 2009/0113397 A1* | 4/2009 | Wright, Sr. ............ G06Q 30/04 705/34 |
| 2009/0254524 A1 | 10/2009 | Francker et al. |
| 2010/0332473 A1 | 12/2010 | Brodsky et al. |
| 2011/0161946 A1 | 6/2011 | Thomson et al. |
| 2011/0214108 A1 | 9/2011 | Grunberg et al. |
| 2012/0260236 A1 | 10/2012 | Basak et al. |
| 2015/0234730 A1 | 8/2015 | Puthuff et al. |
| 2016/0092336 A1* | 3/2016 | Atanasiu ............ G06F 11/3698 717/133 |
| 2017/0083585 A1 | 3/2017 | Chen et al. |
| 2019/0012254 A1 | 1/2019 | Gupta et al. |
| 2019/0129724 A1 | 5/2019 | Haun |
| 2019/0163452 A1 | 5/2019 | Hoffmann et al. |
| 2020/0104103 A1 | 4/2020 | Mair |
| 2020/0257615 A1* | 8/2020 | Richardson .......... G06F 11/323 |
| 2020/0409668 A1 | 12/2020 | Eberlein et al. |
| 2021/0182033 A1 | 6/2021 | Perez Alvarez et al. |
| 2021/0218648 A1 | 7/2021 | Clegg et al. |
| 2021/0232485 A1 | 7/2021 | Agarwal et al. |

OTHER PUBLICATIONS

McNutt et al., "A Study of Editor Features in a Creative Coding Classroom," ACM, 2023. (Year: 2023).*

A. Moser et al., "Exploring Multiple Execution Paths for Malware Analysis"; 2007.

F. Ferrandi et al.; "Implicit Test Generation for Behavioral VHDL Models," 1998.

Urgaonkar et al., "An Analytical Model for Multi-tier Internet Services and Its Application," SIGMETRICS'05, Jun. 6-10, 2005; 12 pages.

Gilpin, K. et al, Specification for AppMap Clients, GitHub [online], Apr. 2019 [retrieved Jul. 27, 2022], Retrieved from Internet: https://github.com/applandinc/appmap/tree/e4c7a1e89cee5cee6ac98d32356190aa04d5cdd9>, pp. 1-10.

* cited by examiner

```
 1  class SessionsController < ApplicationController
 2
 3    # @label acess.public
 4    def new
 5    end
 6
 7    # Login a new user.
 8    # @label access.public security.login
 9    def create
10      user = User.find_by(email: params[:session][:email].downcase)
11      if user && user.authenticate(params[:session][:password])
12        if user.activated?
13          forwarding_url = session[:forwarding_url]
14          reset_session
15          log_in user
16          params[:session][:remember_me] == '1' ? remember(user) : forget(user)
17          redirect_to forwarding_url || user
18        else
19          message  = "Account not activated."
20          message += "Check your email for the activation link."
21          flash[:warning] = message
22          redirect_to root_url
23        end
24      else
25        flash.now[:danger] = 'Invalid email/password combination'
26        render 'new'
27      end
28    end
29
30    def destroy
31      log_out
32      redirect_to root_url
33    end
34  end
```

FIGURE 4

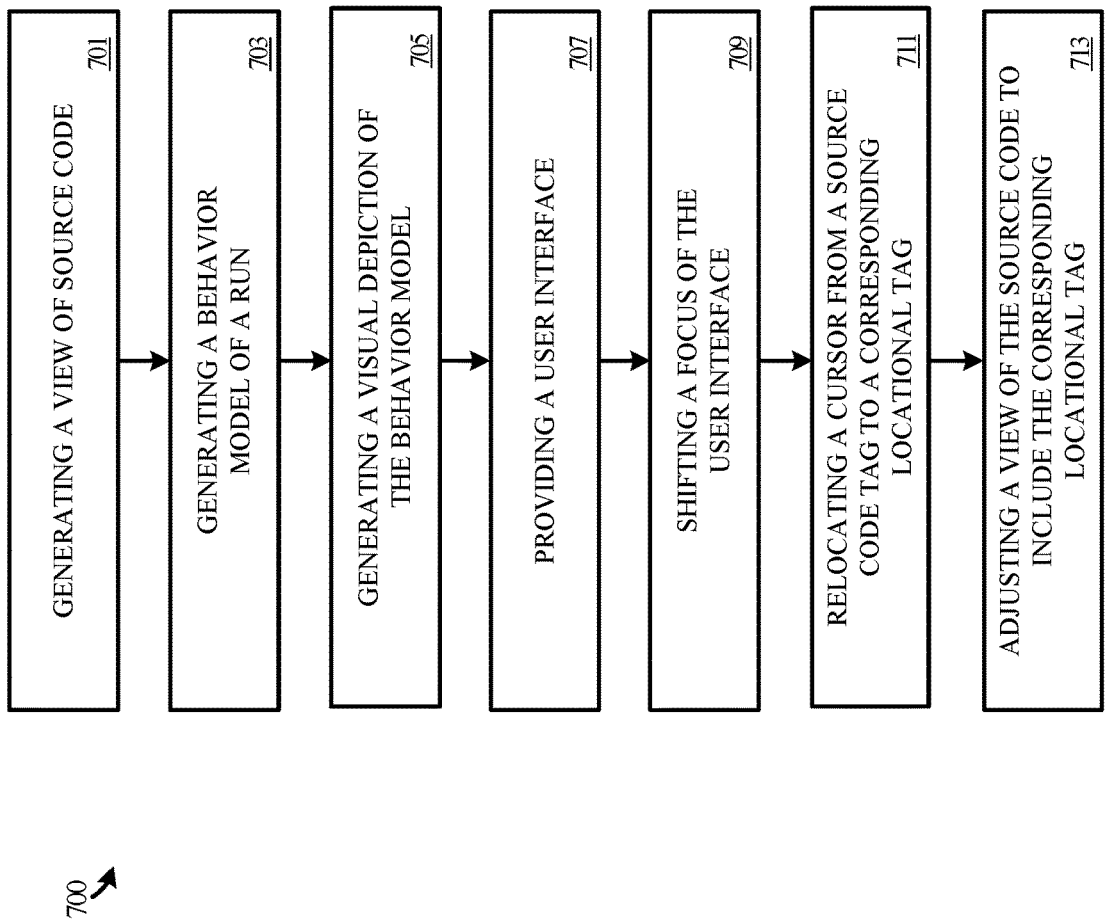

SYSTEMS AND METHODS FOR INTELLIGENT INTERROGATION AND TAGGING OF A CODEBASE

CROSS REFERENCE TO RELATED APPLICATIONS

This application is related to contemporaneously filed U.S. Patent Application entitled "INTELLIGENT RUN-TIME COMPLICATION IDENTIFICATION AND SOLUTION GENERATION FOR A CODEBASE," the contents of which is incorporated by reference in its entirety for all purposes.

TECHNICAL FIELD

Aspects of the disclosure are related to the field of computer software applications and in particular to intelligently interrogating and tagging a codebase, along with the associated technology.

BACKGROUND

Computer software developers create software using tools that allow the developers to generate and debug code. Some software exists for analysis of the codebase, including debugging, but it is often helpful for software developers to understand how the codebase will react during runtime. Computer program debugging techniques are used during and after software development to locate and fix errors in the codebase of an application and ensure that the codebase generally operates as expected. For example, static analysis and dynamic analysis techniques are typically employed in a testing environment during software development to debug the codebase. Software developers use these techniques to try to avoid finding bugs or other anomalous behavior of a codebase after the software is operating in a production environment (e.g., where end-users interact with the functions of the codebase). Static analysis techniques ensure that the codebase is meeting typical industry standards and do not require execution of the software application's codebase. Alternatively, dynamic analysis techniques are used to identify complications that arise during execution of the codebase, typically in a testing environment.

After receiving the results of a debugging analysis, programmers employ a code editor to correct or otherwise modify the codebase.

Although useful, static analysis techniques and dynamic analysis techniques are unable to identify complications that become evident at production scale. Static analysis primarily identifies context-related bugs, and dynamic analysis is subject to strain that is limited to a testing environment. When used in combination, these analysis techniques make up for some shortcomings of the other. However, current software application development and analysis tools do not offer a solution that combines the testing and evaluation capabilities of both the static and dynamic analysis techniques. Additionally, current software application development and analysis tools do not offer a solution that further includes an ability to identify production level run-time complications. Thus, programmers are required to implement separate development tools to analyze the codebase in either the static or dynamic state, wait for production implementation to get reports on production run-time complications, and search through a code editor to access and modify the codebase.

Furthermore, current software application development and analysis tools do not offer a solution that combines the offerings of debugging operations with the code editing functionality of a code editor. As a result, programmers must open an additional code editing environment to mitigate the errors and bugs identified during the debugging analysis. Time and computing resources are then wasted trying to locate the individual lines of code responsible for causing errors identified during debugging operations.

It is with respect to this general technical environment that aspects of the present technology disclosed herein have been contemplated. Furthermore, although a general environment has been discussed, it should be understood that the examples described herein should not be limited to the general environment identified in the background.

Overview

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that includes generating a view of a codebase, wherein generating the view of the codebase comprises placing a plurality of locational tags throughout the codebase. The method also includes generating a behavior model of a run by interrogating a recording of an execution of the codebase, wherein the behavior model represents a run-time behavior of the codebase. The method also includes generating a visual depiction of the behavior model comprising: a plurality of functional blocks, each functional block representing a step executed during the run, a plurality of code paths, each code path connecting at least two functional blocks based on the run, and a plurality of codebase tags, wherein each codebase tag pins a location of the codebase tag in the behavior model to a corresponding locational tag of the plurality of locational tags in the codebase. The method also includes providing a user interface (UI) comprising a first pane and a second pane, the first pane comprising the visual depiction of the behavior model, and the second pane comprising the view of the codebase. The method also includes in response to receiving a selection of a first codebase tag of the codebase tags in the behavior model: shifting a focus of the UI from the first pane to the second pane, relocating a cursor from the first codebase tag to the corresponding locational tag in the codebase, and adjusting a visible portion of the view of the codebase to include the corresponding locational tag. Other embodiments of this aspect include corresponding computer systems, apparatus, and computer programs recorded on one or more computer storage devices, each configured to perform the actions of the methods.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 4 illustrates a view of codebase, according to some embodiments.

FIG. 7 illustrates an interrogation and tagging process, according to some embodiments.

DETAILED DESCRIPTION

Figure 1:
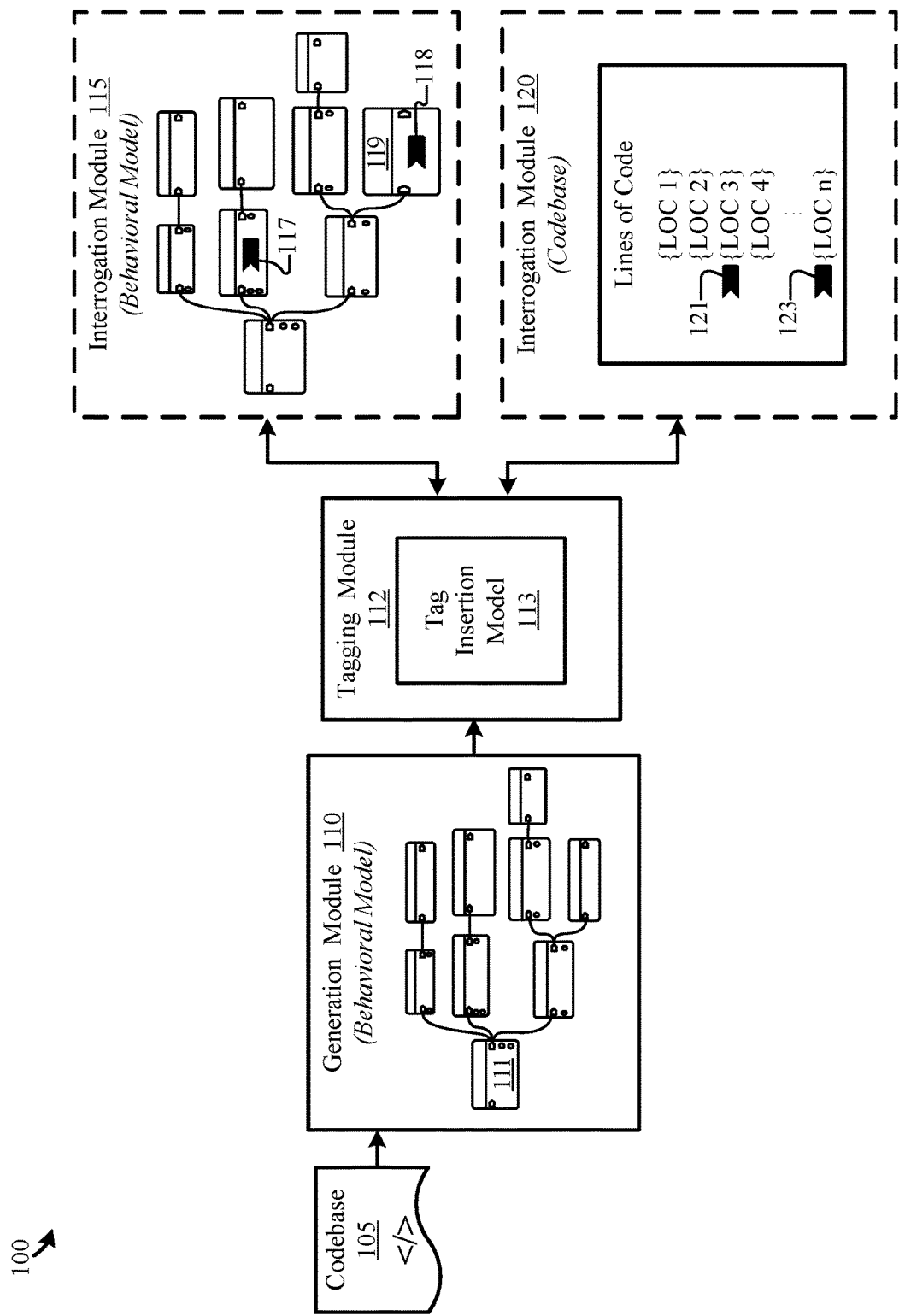
FIG. 1 illustrates a logical data flow for a tagging system that intelligently interrogates and tags a codebase, according to some embodiments.

Various implementations are disclosed herein that describe technology for intelligently interrogating and tagging a codebase. In many situations, during software development, developers desire a way to view the code in a pictorial manner rather than the textual view often afforded by a code editor. Additionally, understanding the run-time behavior of a codebase can be helpful in understanding how the codebase will behave during execution in a run-time, production scale environment. Further, codebases may include design flaws that are difficult to identify during the development phase and that create run-time complications (e.g., syntax errors, memory leaks, security issues, performance issues, inefficient data access, improper access control, or the like) that may not be identified until the codebase is deploying in a full scale environment, such as a production environment. For example, a codebase may include poorly designed code that results in memory leaks, inefficient data access, improper access control, or the like. A typical debugger may not identify the inefficient data access, the memory leaks, improper access control, or the like based on a static analysis or dynamic analysis. For example, a memory leak or inefficient data access may not be identified until the application is running in production with a production-level amount of strain and users, and the poorly designed portion of the codebase is called a sufficient number of times to expose the issue. Additionally, until a sufficient number of users with varying privileges access the application, one may not find that he or she can or cannot access certain data as expected to identify the improper access control. Similarly, other poorly designed code may not be apparent prior to production-level use. Before operating a software application in a production environment, a run-time analyzer that generates a behavior model that may allow a developer to view the run-time, production level behavior of the codebase in a pre-production or testing environment. Further, a complication identifier can be implemented to identify design flaws in the codebase during the development phase.

A behavioral model generator may generate a behavioral model of a codebase using run-time analysis techniques that include a hybrid static and dynamic analysis. The behavioral model represents the run-time functionality and behavior of the codebase based on a run-time analysis of the codebase. The behavioral model may be created by executing the codebase in a development environment, testing environment, pre-production environment, Continuous Integration (CI) environment, in development containers, or the like. The execution may be recorded by, for example, recording the events, functions, inputs, outputs, parameters, connection points, server requests, and the like that occur during the execution of the codebase.

In some embodiments, a run-time complication identifier may interrogate the behavioral model to identify the events, functions, errors, complications, possible performance issues, etc. of the codebase. With or without execution of the run-time complication identifier, a tag insertion module generates associations (e.g., locational tags, source tags, etc.) that link elements of the behavioral model (e.g., functional blocks, code paths, etc.) to corresponding locations within the codebase. A user interface that includes depictions of the links (e.g., locational tags, source tags, etc.) that are selectable to transition a focus of the user interface bidirectionally between a visual depiction of the behavior model and an interactive view of the codebase is generated and displayed. For example, the user interface may include a visual depiction of the behavioral model and a codebase tag located within a functional block of the behavioral model. The codebase tag may be depicted as a selectable user interface element (e.g., a selectable functional block, a selectable code path, etc.), as a visual representation of a selectable link (e.g., a selectable pin, text, icon, image, hyperlink, etc.), and the like. The codebase tag pins a location of the codebase tag (e.g., within the functional block, etc.) to a corresponding locational tag placed within the codebase. Selection of the codebase tag causes a focus of the user interface to shift from the visual depiction of the behavioral model to a view of the codebase that includes a locational tag. The user may then edit or otherwise update the codebase depicted in the view of the codebase via the user interface, and the system may store the modified codebase (e.g., in a repository). For example, the system may update the codebase based on an input that modifies the codebase. The input may be received via a view of the codebase in a user interface to the system.

In the same or other examples, the user interface includes a view of the codebase and locational tags placed throughout the codebase. The locational tags may be depicted as visual representations of links such as selectable pins, text, icons, images, hyperlinks, etc. A locational tag pins a location of the locational tag within the codebase to a corresponding codebase tag in the behavioral model. Selection of a locational tag causes a focus of the user interface to shift from the view of the codebase to a view of the behavioral model that includes the corresponding codebase tag.

In some implementations, the system is implemented in software that can be downloaded and executed on a local computing device (e.g., a server, desktop, laptop, etc.). In other implementations, the system is implemented in a cloud-based service hosted by a service provider. In a cloud-based service implementation, online services to intelligently interrogate and tag run-time complications within the codebase are provided and a user interface is hosted that provides visualizations for the user to access. Example run-time complications include memory leaks, security issues, performance issues, specified performance characteristics, inefficient data access, improper access control, and the like.

Implementations of the technology described herein provide various advantages over the available technologies. Run-time complications that would not be identified prior to deploying a software application in a production environment can be identified, saving human capital time, human capital resources, computational time, processor and memory resources, and application downtime. Further, run-time complications can be pinpointed without waiting for production downtime to perform post-issue root-cause analysis. Instead, the root-cause of issues are identified prior to the run-time complication occurring in a production environment. Additionally, the application of an analyzer that identifies static and dynamic complications within the codebase allows simultaneous analysis without the use of separate static and dynamic analyzers. For example, a dynamic analysis of the codebase is completed based on analyzing the behavioral model of the codebase, and a static analysis of the codebase is also performed based on identifying problem patterns within the behavioral model. Once the codebase is analyzed, bidirectional tags are generated and appended to elements of the behavioral model and/or placed at locations within the codebase. The bidirectional tags facilitate locating lines of codebase that are responsible for specific events, functions, errors, and complications identified in the behavioral model, and vice versa.

Figure 9:
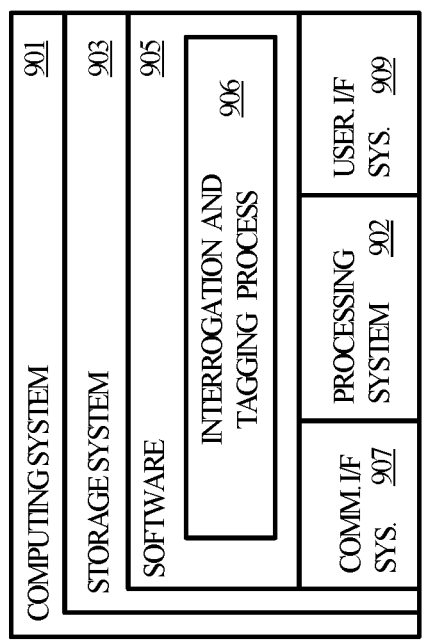
FIG. 9 illustrates a computing system suitable for implementing the various operational environments, architectures, processes, scenarios, and sequences discussed below with respect to the other Figures.

Turning to the figures, FIG. 1 describes logical data flow 100 for intelligently interrogating and tagging a codebase in an implementation. Logical data flow 100 includes codebase 105, generation module 110, tagging module 112, behavioral model interrogation module 115, and codebase interrogation module 120. Behavioral model interrogation module 115 and codebase interrogation module 120 are optional modules of flow 100, as indicated by the dashed border. Logical data flow 100 may be implemented in hardware, software, and/or firmware, and in the context of one or more computing systems, of which computing device 901 of FIG. 9 is representative. Logical data flow 100 may be implemented on a variety of systems including both local and cloud-based systems, which are further described in FIG. 2 and FIG. 3, respectively.

Codebase 105 represents a body of source code for a software application. In some instances, codebase 105 is a complete body of source code. Software applications represented by codebase 105 can include locally installed applications on a personal computer, locally installed applications on a server, applications served from a cloud-based server, web applications, applications for installation on a mobile device, or the like, or a combination. For example, in some embodiments, codebase 105 includes more than one codebase such as code executed on a backend server as well as code executed on a user device and/or other machines that all work together to form a single software system. Codebase 105 may be written in any coding language, such as, for example JAVA, RUBY, C, C++, FORTRAN, PYTHON, JAVASCRIPT, or the like.

Generation module 110 generates a behavioral model (e.g., behavioral model 111) based on a run-time analysis of codebase 105. Generation module 110 may execute codebase 105 in a test environment, pre-production environment, development containers, Continuous Integration (CI) environment, or the like and record the execution of codebase 105. The recording details the events, functions, inputs, outputs, server requests, message queues, and the like that occur during a run of codebase 105. The recording may generate trace files and other diagnostic logs that detail the behavior of codebase 105 during operation. In some embodiments, codebase 105 may include more than one codebase. For example, codebase 105 may include code executed on a backend server as well as code executed on a user device and/or other machines that all work together to form a single software system. Behavioral model generation 110 may be performed in any suitable environment but is typically performed prior to release of the codebase 105 to a production environment so as to identify any run-time complications prior to release. For example, executing codebase 105 to generate the behavioral model may be done in a pre-production environment, in a development container, in a testing environment, in a Continuous Integration (CI) environment, or the like.

The execution of codebase 105 may be performed exhaustively using one or more of a number of different techniques including using artificial intelligence (e.g., machine learning models) to probe codebase 105, and using test scripts to probe codebase 105. For example, test cases that probe codebase 105 may be generated and automatically executed and the execution of the codebase 105 using the test cases may be recorded to generate trace files. The test cases may include recording each server request including HyperText Transport Protocol (HTTP) server requests. As another example, the trace files may be generated based on recording human interaction with the executing codebase 105 (e.g., a user may run codebase 105 and interact with a user interface generated by execution of codebase 105). The trace files may include all threads of execution including background jobs, message queue activity, server requests (e.g., HTTP server requests, database server requests, etc.), and the like. As another example, isolated code blocks of codebase 105 may be executed to generate the trace files. The isolated code blocks may include, for example, a Ruby block, a Java Runnable, or a Python context manager (e.g., with statement). The isolated code block may include any number of lines of code from codebase 105. As another example, the trace files may be generated based on one or more processes performed during execution of codebase 105. Processes may include, for example, a login/authentication process, a data submission process (e.g., submission of data entered by a user into a user interface), or any other process. As another example, the trace files may be generated based on synthetic traffic generated to simulate a number of users accessing the executing codebase 105 as may be seen in a production environment. For example, a simulation engine may be used to generate the synthetic traffic.

In some embodiments, codebase 105 may include more than one codebase. For example, codebase 105 may include code executed on a backend server as well as code executed on a user device and/or other machines that all work together to form a single software system. Accordingly, in some embodiments, multiple trace files are generated and analyzed. Generation module 110 may analyze and interrogate the trace files to generate a behavioral model. Generation module 110 may label the event and/or function steps of codebase 105 and may further label any code paths that connect the various steps.

Figure 5A:
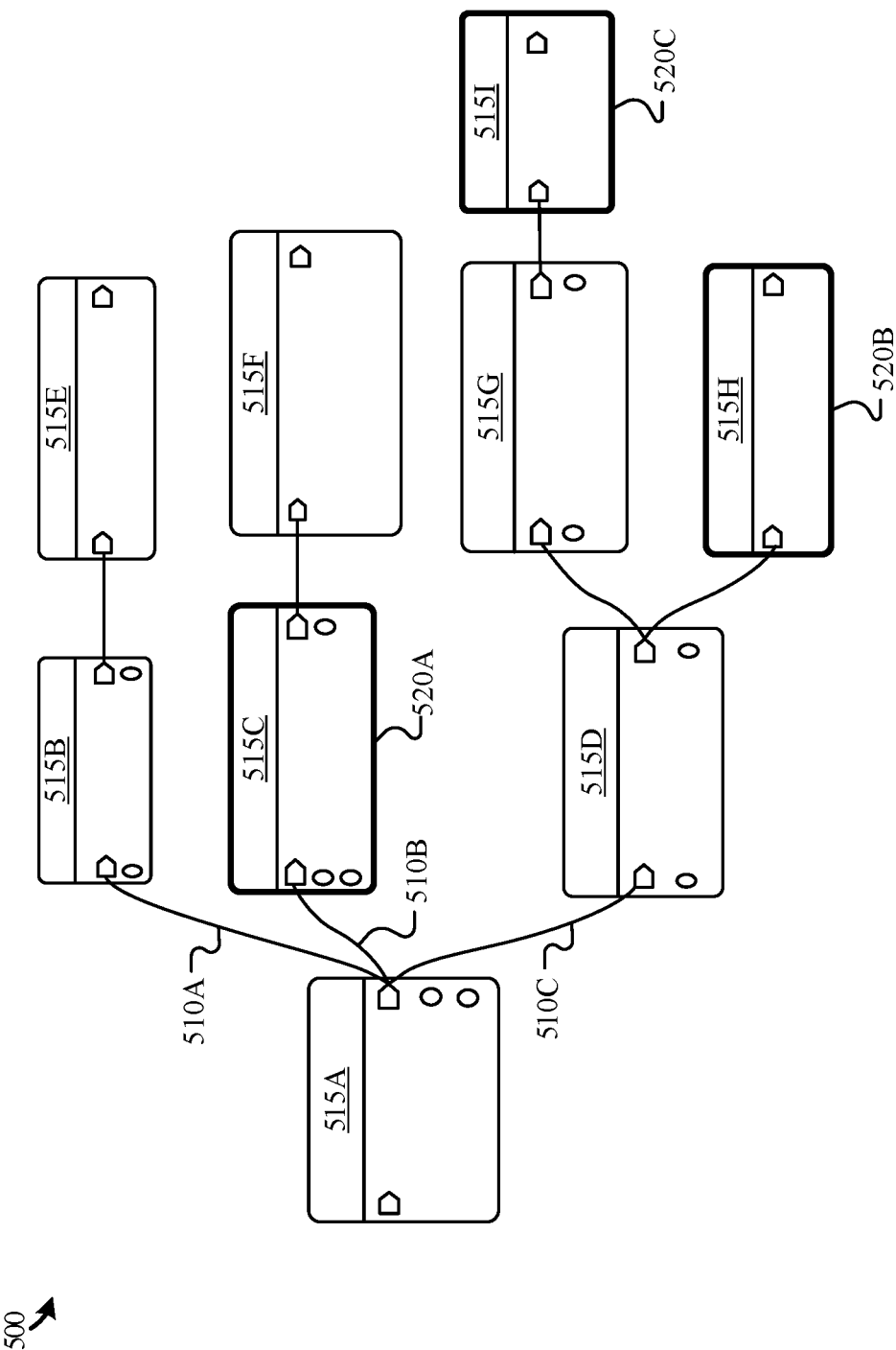
FIGS. 5A and 5B illustrate exemplary visual depictions of a behavioral model, according to some embodiments.
Figure 5B:
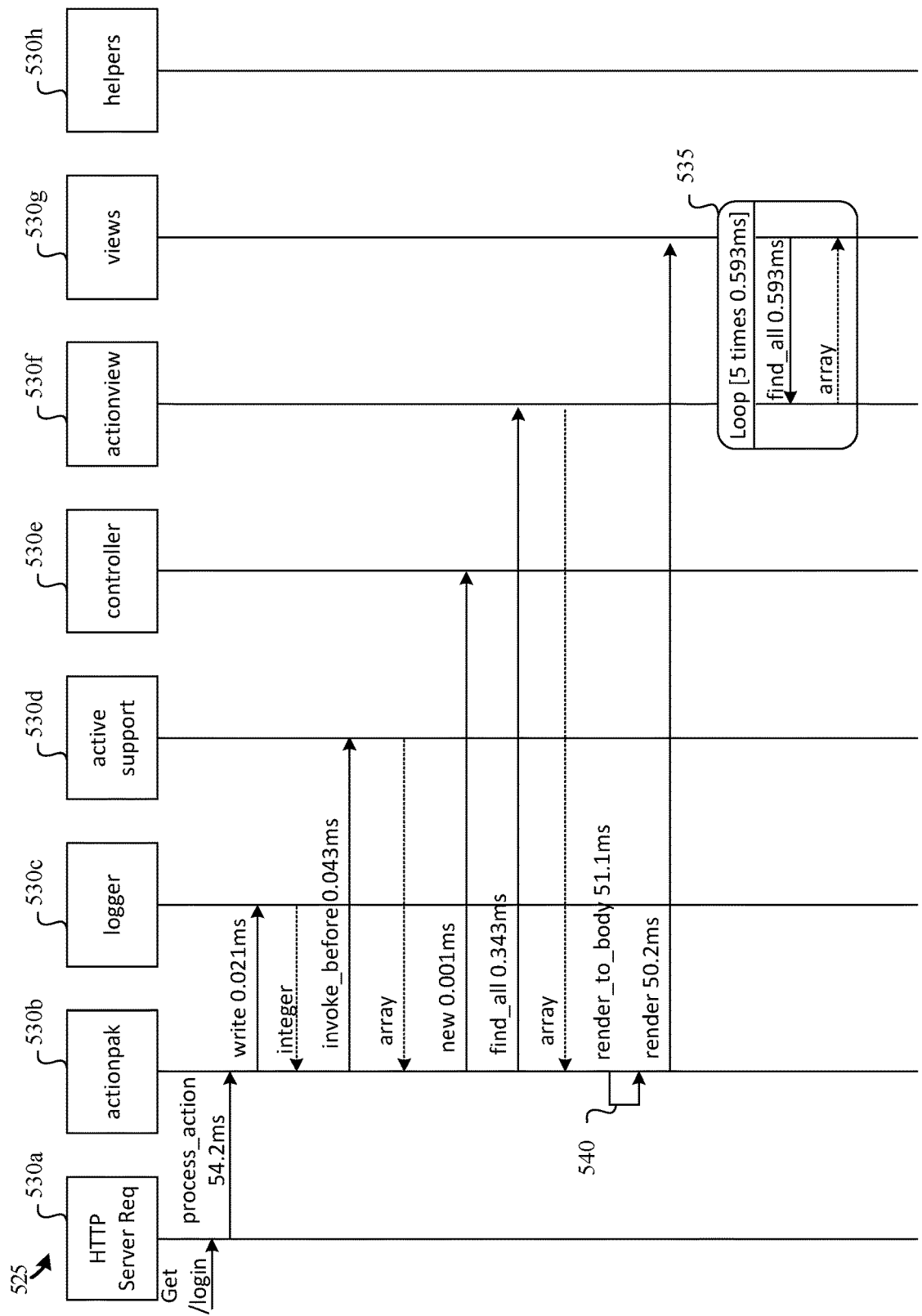

The behavioral model created by generation module 110 can be visualized as generally depicted in the Figures. For example, the visualization of the behavioral model may include steps performed by the application, inputs and outputs from the steps, and code paths connecting the steps. The behavioral model represents the run-time behavior of codebase 105. In other words, generation module 110 analyzes the execution of codebase 105 (e.g., within a testing environment, etc.) to generate a representation of the run-time behavior of codebase 105. Example visual depictions 500 and 525 of a behavioral model are illustrated in FIGS. 5A and 5B described below. In some embodiments, functional areas of codebase 105 may be labeled, and a visual depiction may include elements for the functional areas of the codebase 105 that have a size related to the density of the underlying code for the functional area. For example, various functional areas may include APIs, security, web services, user input elements, and the like.

Tagging module 112 may be used to insert locational tags within the codebase 105 and corresponding codebase tags in the behavioral model (e.g., using metadata as described herein) to correlate locations in the behavioral model with locations in the codebase 105. Tagging module 112 may utilize tag insertion model 113 to insert the tags. Tag insertion model 113 represents definitions and patterns for generating and locating tags that include links for connecting portions of a behavioral model to corresponding lines of code within a codebase (e.g., codebase 105). For example, tag insertion model 113 defines the conditions under which tags are to be generated. Example conditions include when an error is identified, when a complication is identified, when an event occurs, when a function occurs, when a pattern occurs, when a possible performance issue is identified, etc. Tag insertion model 113 defines the type of tag to generate. Example of tag types include a selectable user interface element depicted in a visual representation of a behavioral model (e.g., a functional block, a code path, etc.), a selectable user interface element depicted in a visual representation of a codebase, a visual representation of a link (e.g., a pin, a text, an icon, an image, a hyperlink, etc.), and the like.

Tag insertion model 113 further defines where to position, append, or otherwise place the tag. For example, tag insertion model 113 may indicate that a tag be positioned in a behavioral model and/or codebase based on a location of a possible performance issue in the codebase, the beginning or end of a process, the beginning or end of function call, the beginning or end of server request, or the like. For example, tag insertion model 113 may indicate that a tag be placed in line with a specific line of the codebase; in line with a line of code at the beginning, midpoint, or end of an operation in the codebase; in a view of the codebase; etc. In the same or other examples, tag insertion model 113 may indicate that a tag be appended to functional block, code path, or other element of a behavioral model; to a functional block or code path in a depiction of the behavioral model; etc. In the same or other examples, tag insertion model 113 may indicate that a codebase tag is to be positioned at each functional block of a behavioral model. Tagging module 112 may use tag insertion model 113 to generate and place the tags. Tagging module 112 may interrogate both the behavioral model and codebase to identify the corresponding locations and may use the trace files in some cases to correlate the locations in the behavioral model to the codebase or vice versa. The locations may be identified based on the definitions in the tag insertion model 113. In some embodiments, tagging module 112 may use behavioral model interrogation module 115 and codebase interrogation module 120 to interrogate the behavioral model and codebase to provide the relevant data for tag insertion. Though tagging module 112 is depicted as being separate from behavioral model interrogation module 115 and codebase interrogation module 120, it is contemplated herein that in some embodiments, tagging module 112 is an element of or includes behavioral model interrogation module 115, codebase interrogation module 120, or both. Accordingly, tagging module 112 may independently interrogate the codebase 105, the behavioral model, or both, or it may use other modules to perform the interrogation such that tagging module 112 uses behavioral model interrogation module 115 to interrogate the behavioral model and codebase interrogation module 120 to interrogate the codebase 105. While much of the description for interrogation discusses interrogating the codebase for run-time complications, this is only one example and interrogation can include identifying locations for any other reason as discussed using tag insertion model 113.

Any of tagging module 112, behavioral model interrogation module 115, and codebase interrogation module 120 may generate metadata associated with each tag and correlate the metadata with the tags so that a tag identifier may be used to identify a locational tag in the codebase, a codebase tag in the behavioral model, and other information relevant to the tag including recency information (e.g., when the tag was first introduced, when the code in the codebase was introduced, when an issue associated with the code was introduced, or the like), connection information to other related systems such as an issue tracking system, and the like.

Behavioral model interrogation module 115 may generate tags (e.g., codebase tags 117 and 118) and identify locations within the behavioral model to append the tags (e.g., functional block 119) and transmit such information back to tagging module 112 to insert the tags in some embodiments. In some embodiments, behavioral model interrogation module 115 may employ tag insertion model 113 to insert tags independently from tagging module 112. For example, tags may be appended to locations that correlate to run-time complications identified by behavioral model interrogation module 115; to locations that correspond to tags placed throughout codebase 105 (e.g., locational tags 121 and 123); functional block, code path, or other element of a behavioral model; etc. Codebase tags may be provided in a user interface as depicted in examples shown in FIGS. 5, 6A, 6B, 8A, and 8B.

For embodiments in which codebase tags are appended to locations that correlate to run-time complications, behavioral model interrogation module 115 may probe the behavioral model generated by generation module 110 to identify the run-time complications that occur during the execution of codebase 105. The interrogation of the behavioral model uses a variety of sources to classify run-time complications. For example, common problem patterns in coding environments may be used to identify run-time complications. Behavioral model interrogation module 115 compares these problem patterns to the generated behavioral model to identify recognized problem patterns within codebase 105. Examples sources in which problem patterns are collected include the MITRE common weaknesses enumeration (CWE) reports as well as other reports developed by site reliability engineers, development operation engineers, or qualified individuals of the like. MITRE CWE reports are a predefined list of common software weaknesses and flaws developed by an outside corporation which primarily detail static software problems and security issues. Reports developed by individual engineers detail common performance flaws along with their root cause to identify dynamic software complications within the behavioral model. In some embodiments, artificial intelligence may be used to identify run-time complications. For example, machine learning models may be applied that identify memory leaks, inefficient data access, improper access control, and other design flaws that otherwise do not become apparent until codebase 105 is deployed in a production environment.

Codebase interrogation module 120 may generate tags and provide them to tagging module 112 to insert. In some embodiments, codebase interrogation module 120 may employ tag insertion model 113 to generate tags (e.g., locational tags 121 and 123) and identify locations within codebase 105 to place the tags (e.g., line of code 3, line of code n) and place them independently of tagging module 112. For example, tags may be placed at locations that correlate to run-time complications identified by codebase interrogation module 120; to locations that correspond to tags inserted in the behavioral model (e.g., codebase tags 117 and 118); in line with a specific line of the codebase; in line with a line of code at the beginning, midpoint, or end of an operation in the codebase; in a view of the codebase; etc. Locational tags may be provided in a user interface as depicted in examples shown in FIGS. 4, 6A, 6B, 8A, and 8B.

For embodiments in which locational tags are placed at locations that correlate to run-time complications, codebase interrogation module 120 may probe the behavioral model generated by generation module 110 to identify run-time complications of codebase 105. Codebase interrogation module 120 uses a variety of sources to classify run-time complications. For example, common problem patterns associated with a specific coding language may be used to identify errors in the structure and syntax of codebase 105. Codebase interrogation module 120 compares these problem patterns to the generated behavioral model and to the lines of code that underlie the events, functions, and code paths to identify problem patterns within codebase 105. Examples sources in which problem patterns are collected include the MITRE common weaknesses enumeration (CWE) reports as well as other reports developed by site reliability engineers, development operation engineers, or qualified individuals of the like. MITRE CWE reports are a predefined list of common software weaknesses and flaws developed by an outside corporation which primarily detail static software problems and security issues. Reports developed by individual engineers detail common performance flaws along with their root cause to identify dynamic software complications within the behavioral model as well as within codebase 105. In some embodiments, artificial intelligence may be used to identify complications. For example, machine learning models may be applied that identify memory leaks, inefficient data access, improper access control, and other design flaws that otherwise do not become apparent until codebase 105 is deployed in a production environment.

Trained AI processing may be applicable to assist with any type of predictive or determinative processing including generating the behavioral model based on the execution of the software application and the resulting data files in generation module 110, predicting the run-time complications based on the behavioral model and/or codebase 105 via behavioral model interrogation module 115 and codebase interrogation module 120, and generating and placing tags based on tagging module 112 and tag insertion model 113. The trained AI processing may also assist with classification ranking and/or scoring and relevance ranking and/or scoring. For example, the ranking and ordering of run-time complications and/or errors in codebase 105 may include AI processing. The AI processing may include supervised learning, unsupervised learning, semi-supervised learning, reinforcement learning, or any other type of learning. The types of AI processing may include, for example, machine learning, neural networks, deep neural networks, and/or any other type of AI processing. Non-limiting examples may include nearest neighbor processing; naive bayes classification processing; decision trees; linear regression; support vector machines (SVM) neural networks, perceptron networks, feed forward neural networks, deep feed forward neural networks, multilayer perceptron networks, deep neural networks (DNN), convolutional neural networks (CNN), radial basis functional neural networks, recurrent neural networks (RNN), long short-term memory (LSTM) networks, sequence-to-sequence models, gated recurrent unit neural networks, auto encoder neural networks, variational auto encoder neural networks, denoising auto encoder neural networks, sparse auto encoder neural networks, Markov chain neural networks, Hopfield neural networks, Boltzmann machine neural networks, restricted Boltzmann machine neural networks, deep belief networks, deep convolutional networks, deconvolutional networks, generative adversarial networks, liquid state machine neural networks, extreme learning machine neural networks, echo state networks, deep residual networks, Kohonen networks, neural turing machine neural networks, modular neural networks, transformers, clustering processing including k-means for clustering problems, hierarchical clustering, mixture modeling, application of association rule learning, application of latent variable modeling, anomaly detection, assumption determination processing; generative modeling; low-density separation processing and graph-based method processing, value-based processing, policy-based processing, model-based processing, and the like.

Figure 2:
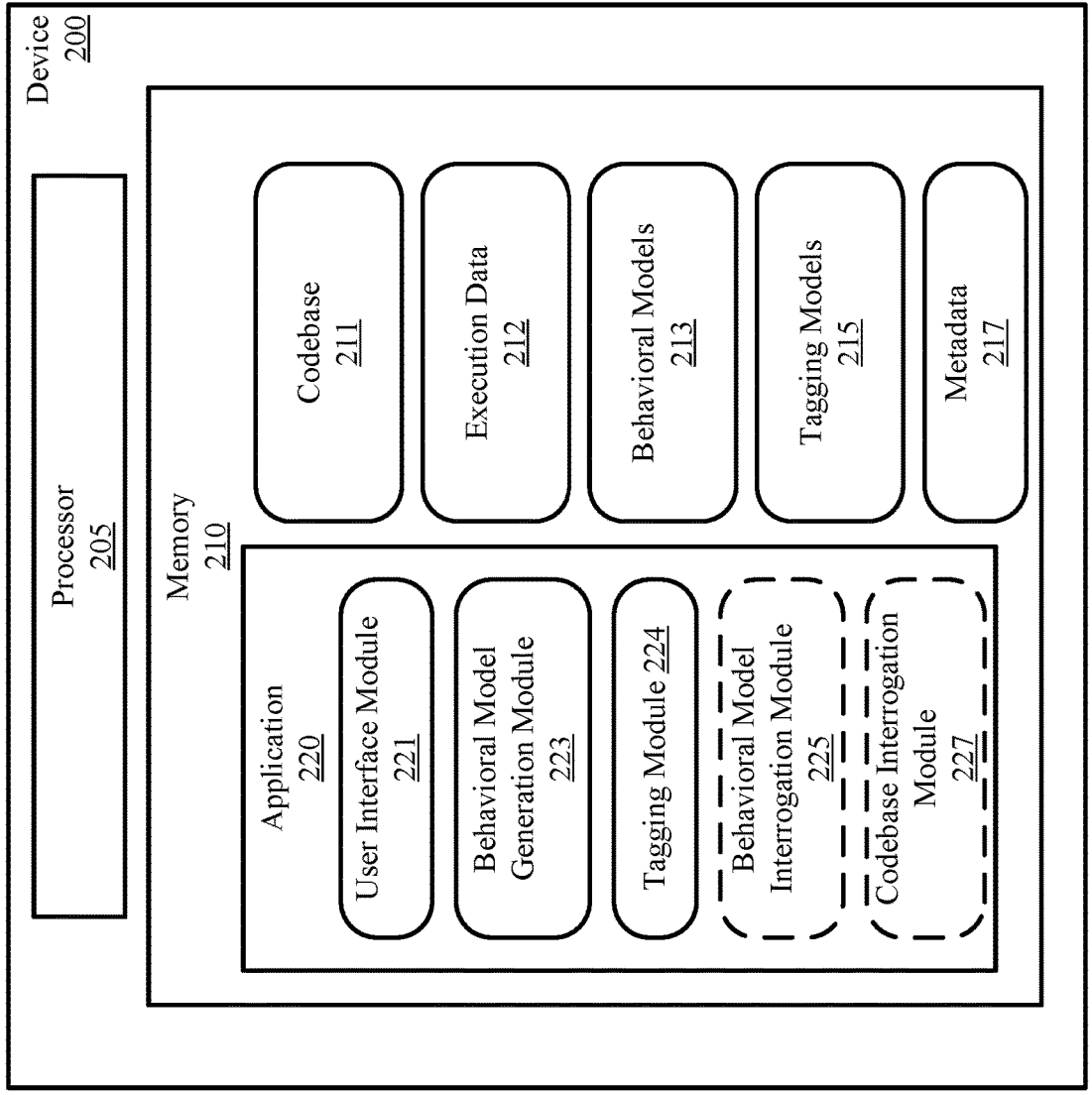
FIG. 2 illustrates an exemplary computing system for intelligently interrogating and tagging a codebase in a local implementation for downloadable embodiments.

FIG. 2 illustrates computing device 200 for tagging a codebase and behavioral model in a local implementation for downloadable embodiments. Computing device 200 includes a processing unit (e.g., processor 205) responsible for reading computer readable storage media such as memory 210. Computing device 200 may be any computing device that can download and execute software for performing functions to execute the logical data flow 100 of FIG. 1. For example, computing device 200 may be a server, personal computer, laptop, server farm, distributed computing environment, or the like. Computing device 200 may be, for example, the same as computing device 901 of FIG. 9, which depicts additional functionality of a standard computing device not expressly discussed with reference to device 200 for the purpose of simplicity.

Processor 205 is representative of a processing unit that executes application 220. Examples of processor 205 include a general-purpose central processing unit, a graphical processing unit, an application specific processor, a logic device, etc. In some embodiments, processor 205 is representative of processing system 902 of FIG. 9.

Memory 210 includes codebase 211, execution data 212, behavioral models 213, tagging models 215, metadata 217, and application 220. Codebase 211 represents a body of source code for a software application (e.g., codebase 105 of FIG. 1). Codebase 211 may be user generated, uploaded, and stored in memory 210, or otherwise accessed by device 200. Codebase 211 may be collected using a user interface of application 220. Application 220 performs the functions for executing logical data flow 100 described with respect to FIG. 1 to intelligently interrogate and tag codebase 211. In some embodiments, memory 210 is representative of storage system 903 of FIG. 9.

Execution data 212 represents operational definitions that specify the behavior of elements of a specific coding language (e.g., JAVA, RUBY, etc.). For example, execution data 212 may include test cases for executing codebase 211, information for generating synthetic traffic, data for defining code blocks for specific code block execution, data for defining specific processes for execution, and the like.

Tagging models 215 represents definitions and patterns for generating and positioning tags that include links for connecting portions of a behavioral model to corresponding lines of code within a codebase (e.g., codebase 211), and vice versa. In some embodiments, tagging models 215 is representative of tag insertion model 113 of FIG. 1.

Behavioral models 213 represents a run-time analysis of codebase 211 and includes operational details and events observed while executing codebase 211. Behavioral models 213 may include elements that were generated based on recordings, trace files, error logs, diagnostic logs, and the like. Behavioral models 213 are generated by behavioral model generation module 223.

Metadata 217 may represent metadata collected or generated in tagging codebases and behavior models and may include information on run-time complications identified by behavioral model interrogation module 225 and codebase interrogation module 227. For example, the metadata may include locational information for the tags in both the codebase 211 and behavioral models 213. Additionally, metadata 217 may include recency information about identified run-time complications such as a version the issue was introduced in or a date the issue was introduced. Metadata 217 may also include a category of the issue (e.g., performance issue, security issue, failed test case, or the like), connection information to connect to an issue tracking system, an issue number, a type of flag to use for visualizing the tag (e.g., a squiggle underline, a straight underline, highlighting, a pin, or the like), solution information for identified complications, or any other relevant data associated with the specific portion of the codebase or the specific portion of the behavioral model.

Application 220 is representative of a tagging application and includes user interface module 221, behavioral model generation module 223, tagging module 224, behavioral model interrogation module 225, and codebase interrogation module 227. Behavioral model interrogation module 225 and codebase interrogation module 227 are optional modules of application 220, as indicated by the dashed border. In an implementation, a user interacts with application 220 via a user interface displayed by computing device 200 based on user interface module 221. A user may, for example, interact with application 220, via user interface module 221, to provide access to codebase 211 for analysis, interrogation, and tagging by application 220. Exemplary user interfaces are provided in FIGS. 4, 5, 6A, 6B, 8A, and 8B. Application 220 may be, for example, the same as software 905 of FIG. 9, which depicts additional functionality not expressly discussed with reference to application 220 for the purpose of simplicity.

In an implementation, application 220 generates a behavioral model of codebase 211 using behavioral model generation module 223. The behavioral model generation module 223 may generate the behavioral model as described with respect to generation module 110 of FIG. 1. The behavioral model may be stored in behavioral models 213 of memory 210. The generated behavioral model depicts a run-time behavior of codebase 211.

Application 220 uses tagging models 215 (e.g., in conjunction with at least one of tagging module 224, behavioral model interrogation modules 225, and codebase interrogation module 227) to generate tags and identify locations to position the tags within the behavioral models 213 and codebase 211. Tagging module 224 may tag the behavioral models and codebase as described with respect to tagging module 112 of FIG. 1. Behavioral model interrogation module 225 may provide functionality as described with respect to behavioral model interrogation module 115 of FIG. 1. Codebase interrogation module 227 may provide functionality as described with respect to codebase interrogation module 120 of FIG. 1. For example, tagging module 224 may use tagging models 215 to identify tag locations and tag the corresponding locations in the codebase and the behavioral models. In some embodiments, tagging models 215 may indicate that tags be generated based on run-time complications identified by behavioral model interrogation module 225 and positioned at locations that correlate to the run-time complications identified by behavioral model interrogation module 225. In some examples, tagging models 215 may indicate that tags be generated based on run-time complications identified by codebase interrogation module 227 and positioned at locations that correlate to the run-time complications identified by codebase interrogation module 227. In some examples, tagging module 224 uses tagging models 215 to identify locations based on other criteria such as server requests, the beginning or end of a process, the beginning or end of a function, at a user interface input location, or the like. In some embodiments, tagging models 215 may indicate that tags be generated based on locational tags in the codebase and positioned at locations in the behavioral model that correspond to the locational tags. In the same or in another example, tagging models 215 may indicate that tags be generated based on codebase tags in the behavioral model and positioned at locations in the codebase that correspond to the codebase tags of the behavioral model. In some embodiments, tagging models 215 may indicate additional causes for generating tags as well as provide instructions on where to locate the tags based on the additional causes. AI processing may be used by tagging module 224 (e.g., in conjunction with tagging models 215) to generate tags and identify locations to place the tags within the behavioral model and/or codebase 211.

In an embodiment in which tags are to be generated and positioned based on run-time complications, application 220 may use or otherwise employ behavioral model interrogation module 225 and/or codebase interrogation module 227 to predict run-time complications within codebase 211. For example, behavioral model interrogation module 225 may obtain the generated behavioral model and compare this model to previously identified problem patterns to determine or otherwise identify problem patterns within codebase 211. In the same or different example, codebase interrogation module 227 may obtain the generated behavioral model and compare this model to previously identified problem patterns to determine or otherwise identify problem patterns within codebase 211. Problem patterns may include a variety of types which define both static and dynamic problem patterns. Identification of problem patterns within the behavioral model may result in the identification of run-time complications within codebase 211. AI processing may be used to interrogate the behavioral model and/or codebase 211 to identify problem patterns, anomalies, discrepancies, and other errors and design flaws.

Application 220 may receive, via user interface module 221, user inputs that modify codebase 211. Responsive to the user inputs, application 220 may update codebase 211 based on the modifications indicated by user inputs. Application 220 may then store the modified codebase as codebase 211 or in another repository of memory 210.

Figure 3:
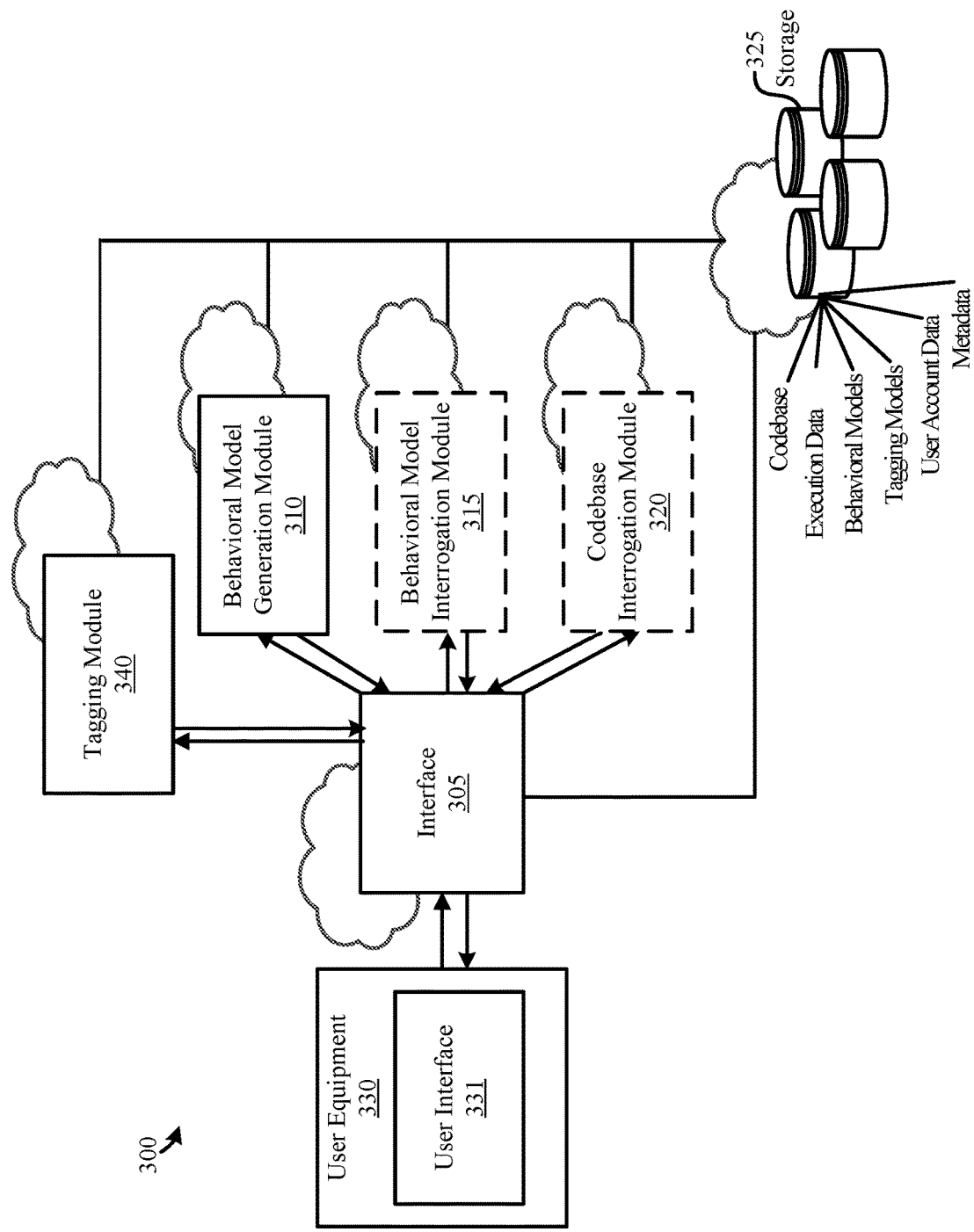
FIG. 3 illustrates an exemplary cloud-based system for intelligently interrogating and tagging a codebase, according to some embodiments.

FIG. 3 illustrates operating environment 300 that may include a cloud-based system to perform the interrogation and tagging techniques described herein in an implementation served by a cloud-based service. Operating environment 300 includes interface 305, behavioral model generation module 310, behavioral model interrogation module 315, codebase interrogation module 320, storage 325, and user equipment 330. Interrogation modules 315 and 320 are optional modules of environment 300, as indicated by the dashed border.

Operating environment 300 represents an example environment in which logical data flow 100 of FIG. 1 may be executed. Interface 305 and modules 310, 315, and 320 may be, for example, representative of software 905 of FIG. 9. A local embodiment in FIG. 2 is shown and a cloud-based embodiment in FIG. 3 is shown, but the specific implementation of the functionality described herein does not depart from the scope of the description, whether performed via a local embodiment or a cloud-based embodiment, using a single computing system or multiple computing systems of which computing device 901 of FIG. 9 is representative.

Interface 305 represents a cloud-based interface to an online service for intelligently interrogating and tagging a codebase. In an implementation, interface 305 makes the online services described herein accessible to a user via user interface 331 on user equipment 330. Interface 305 may communicate with modules 310, 315, and 320, as well as storage 325 to facilitate interrogating and tagging a codebase and to provide visual depictions of the codebase and associated behavior models to a user via user interface 331. Interface 305 may be software that executes on a cloud-based server. Interface 305 may be executed on the same server or a different server than the server(s) executing the behavioral model generation module 310, behavioral model interrogation module 315, and codebase interrogation module 320. Interface 305 may be executed on a server or computing system accessible by behavioral model interrogation module 315, behavioral model generation module 310, storage 325, codebase interrogation module 320, or a combination thereof.

Behavioral model generation module 310 generates a visual representation of the of the operations observed during the execution of a codebase. Behavioral model generation module 310 monitors one or more run-time operations of user equipment 330 which executes the uploaded or stored codebase to generate a behavioral model of the codebase in operation. In an embodiment, behavioral model generation module 310 is representative of generation module 110 described with respect to FIG. 1. Behavioral model generation module 310 may include instructions executed by a processor on a computing system such as a server. In an implementation, behavioral model generation module 310 may interact with storage 325 to source inputs for generating a behavioral model. Behavioral models generated by behavioral model generation module 310 can be stored in storage 325. Behavioral model generation module 310 may be executed on the same server or a different server than the server(s) executing behavioral model interrogation module 315, codebase interrogation module 320, and interface 305. Behavioral model generation module 310 may be executed on a server or computing system accessible by interface 305, behavioral model generation module 310, storage 325, codebase interrogation module 320, or a combination thereof.

Tagging module 314 may identify locations for tagging the behavioral models and corresponding codebases. Tagging module 314 may provide functionality as described with respect to tagging module 112 of FIG. 1 and tagging module 224 of FIG. 2. Tagging module may use tagging models from storage 325, such as tagging insertion model 113 of FIG. 1 to identify locations within the codebase and the corresponding behavioral model to place the tags. Tagging module 314 may access the behavioral models and codebase in storage 325 and may generate metadata associated with the tags and store it in storage 325.

Behavioral model interrogation module 315 interrogates the generated behavioral model to position codebase tags throughout the behavioral model. Behavioral model interrogation module 315 may include instructions executed by a processor on a computing system such as a server. Behavioral model interrogation module 315 may interact with storage 325 to obtain tagging models, such as tagging insertion model 113 of FIG. 1. Behavioral model interrogation module 315 may use the tagging models to generate codebase tags and identify locations within the behavioral model to append the codebase tags. Behavioral model interrogation module 315 may also use AI processing (e.g., in conjunction with the tagging models) to generate codebase tags and identify locations within the behavioral model to append the codebase tags. Behavioral model interrogation module 315 may transmit or otherwise communicate to interface 305 a visual depiction of the behavioral model that includes the codebase tags. Behavioral model interrogation module 315 may store in storage 325 the tagging data in association with the behavioral model. Behavioral model interrogation module 315 may be executed on a server or computing system accessible by interface 305, behavioral model generation module 310, storage 325, codebase interrogation module 320, or a combination thereof. Behavioral model interrogation module 315 may be executed on the same server or a different server than the server(s) executing behavioral model generation module 310, codebase interrogation module 320, and interface 305. Behavioral model interrogation module 315 may be representative of behavioral model interrogation module 115 as described with respect to FIG. 1 and behavioral model interrogation module 225 as described with respect to FIG. 2.

Codebase interrogation module 320 interrogates the generated behavioral model and the underlying codebase to place locational tags throughout the codebase. Codebase interrogation module 320 may include instructions executed by a processor on a computing system such as a server. Codebase interrogation module 320 may interact with storage 325 to obtain tagging models, such as tagging insertion model 113 of FIG. 1. Codebase interrogation module 320 may use the tagging models to generate locational tags and identify locations within the codebase to place the locational tags. AI processing may also be used (e.g., in conjunction with the tagging models) to generate locational tags and identify locations within the codebase to place the locational tags. Codebase interrogation module 320 may transmit or otherwise communicate to interface 305 a view of the codebase that includes the locational tags. Codebase interrogation module 320 may store in storage 325 the tagging data in association with the codebase. Codebase interrogation module 320 may be executed on a server or computing system accessible by interface 305, behavioral model generation module 310, behavioral model interrogation module 315, storage 325, or a combination thereof. Codebase interrogation module 320 may be executed on the same server or a different server than the server(s) executing behavioral model generation module 310, behavioral model interrogation module 315, and interface 305. Codebase interrogation module 320 may be representative of codebase interrogation module 120 as described with respect to FIG. 1 and codebase interrogation module 227 as described with respect to FIG. 2.

Storage 325 interacts with all the online services of operating environment 300 and includes a database of memory housing codebase, execution data, behavioral models, tagging models, user account data, metadata, and the like. Storage 325 may be implemented as a single storage device but may also be implemented across multiple storage devices or sub-systems co-located or distributed relative to each other. Storage 325 may be representative of storage system 903 of FIG. 9.

In some implementations, a user may repeatedly interact with operating environment 300 to interrogate and tag uploaded and/or stored codebases. For example, a user such as a development operations engineer may be developing an application that requires numerous libraries to run. Throughout the development of this example application, the development operations engineer may use a debugger to identify run-time complications while the application is confined to a development and/or testing environment. Multiple executions of the tagging application generate data, which may be housed by storage 325. Storage 325 can also store previously generated user account data, and the tagging application can optimize its performance based on the stored user account data. In some embodiments, data regarding each run of the behavioral model generation module 310, behavioral model interrogation module 315, codebase interrogation module 320, or any combination of them may be stored in storage 325 temporarily or permanently.

User equipment 330 (such as computing device 200 of FIG. 2 and computing device 901 of FIG. 9) includes user interface 331. A user may utilize user interface 331 to perform intelligent interrogations and tagging of a codebase. User interface 331 may be included in a software application installed on user equipment 330 or accessible via a web browser. User equipment 330 communicates with interface 305, to share data between the user and the online services.

In use, a user may access user equipment 330 and interact with user interface 331. Via user interface 331, the user may upload or access a codebase for analysis. The codebase may be stored in storage 325. The user interface 331 communicates with interface 305 to request analysis of the codebase based on user input into user interface 331. Interface 305 requests behavioral model generation module 310 to generate a behavioral model of the codebase. In some embodiments, if a behavioral model for the codebase already exists from a prior run of the behavioral model generation module 310 for that codebase, the stored behavioral model may be accessed from storage 325. The behavioral model is generated as described with respect to generation module 110 of FIG. 1. Interface 305 may make the behavioral model accessible to the user via the user interface 331.

In an embodiment, Interface 305 or behavioral model generation module 310 may request that the behavioral model be interrogated, which may be performed by tagging module 340, behavioral model interrogation module 315, or a combination. Tagging module 340 or behavioral model interrogation module 315 may interrogate and tag the behavioral model. Behavioral model interrogation module 315 may interrogate and tag the behavioral model as described with respect to behavioral model interrogation module 115 of FIG. 1, tagging module 340 may interrogate and tag the behavioral model as described with respect to tagging module 112 of FIG. 1, or a combination. The tags, corresponding links, metadata, or the like may be stored in storage 325 in association with the behavioral model by tagging module 340, behavioral model interrogation module 315, or interface 305.

In the same or other embodiment, Interface 305 or behavioral model generation module 310 may request that the codebase be interrogated, which may be performed by tagging module 340, codebase interrogation module 320, or a combination. Tagging module 340 or codebase interrogation module 320 may interrogate and tag the codebase. Codebase interrogation module 320 may interrogate and tag the codebase as descried with respect to codebase interrogation module 120 of FIG. 1, tagging module 340 may interrogate and tag the codebase as described with respect to tagging module 112 of FIG. 1, or a combination. The tags, corresponding links, metadata, or the like may be stored in storage 325 in association with the codebase by tagging module 340, codebase interrogation module 320, or interface 305.

Interface 305 may make available visual depictions of the tags for the user to view via user interface 331. Interface 305 may receive, via user interface 331, user inputs that modify the codebase, and may update the codebase based on the user inputs. Interface 305 may then store the modified codebase in storage 325.

FIG. 4 illustrates a view of codebase 400. Codebase 400 includes lines of code 401 and locational tags 403, 405, and 407, and codebase 400 may be only a portion of a complete codebase. Codebase 400 may be in any coding language and may include lines of code for web applications, locally installed applications, applications served from a cloud, etc. Codebase 400 may be representative of codebase 105 of FIG. 1, codebase 211 of FIG. 2, and the codebase of storage 325 of FIG. 3.

A tagging module interrogates (e.g., using one or more of tagging modules 112, 224, and 340 or codebase interrogation modules 120, 227, and 320 of FIGS. 1-3, respectively) to place locational tags 403, 405, and 407 throughout codebase 400. For example, the tagging module may place locational tag 403 at code line 4 of lines of code 401 because the tagging module identified code line 4 as the start of a function, as the start of a step associated with an identified error and/or complication, as the exact location of an identified error and/or complication, and the like. The tagging module may place locational tag 405 at code line 28 of lines of code 401 because the tagging module identified code line 28 as the end of a function, as the end of a step associated with an identified error and/or complication, as the exact location of an identified error or complication, or the like. The tagging module may place locational tag 407 at code line 30 of lines of code 401 because the tagging module identified code line 30 as corresponding to a codebase tag of a behavioral model (e.g., codebase tag 520C of FIG. 5A). Though locational tags 403, 405, and 407 are depicted as selectable pins, it is contemplated herein that the locational tags may be depicted as any other visual representation of a link such as selectable text, icons, images, hyperlinks, etc.

FIG. 5A illustrates a visual depiction 500 of a behavioral model in an implementation. Visual depiction 500 represents the run-time behavior of the codebase and includes code paths (e.g., code paths 510A-C), functional blocks 515A-I, and codebase tags 520A-C as defined in the behavior model. Code paths represent the functional paths of the codebase in operation. Specifically, code paths connect at least two functional blocks based on the inputs and the output observed during the execution of the codebase. Functional blocks 515A-I represent steps executed during the run of the codebase (e.g., events, data transformations, etc.). Functional blocks 515A-I include details of the inputs received (e.g., in association with the code paths) and details of the outputs generated as part of the execution of the codebase associated with a respective functional block.

A generation module generates the behavioral model represented in visual depiction 500. A tagging module interrogates (e.g., using one or more of tagging modules 112, 224, and 340 or behavioral model interrogation modules 115, 225, and 315 of FIGS. 1-3, respectively) to place locational tags throughout the behavioral model. The tagging module may use a tag insertion model to generate codebase tags 520A-C and to identify locations within visual depiction 500 and the corresponding behavioral model to append locations tags 520A-C. For example, the tagging module may append tag 520A to functional block 515C because functional block 515C is associated with an identified error and/or complication. The tagging module may append tag 520B to functional block 515H because functional block 515H is associated with a specific function, associated with a generic function, associated with a step in the codebase, and the like. The tagging module may append tag 520C to functional block 515I because functional block 515I depicts an event associated with a locational tag in the codebase (e.g., locational tag 407 of FIG. 4). The behavioral model may be stored as a visual representation, such as visual depiction 500 and 525, of the obtained recording and/or as data representing the recorded behavior of the codebase including connection information, code paths, functional categories, and the like. Though codebase tags 520A-C are depicted as selectable functional blocks, it is contemplated herein that codebase tags 520A-C may be depicted as any selectable user interface element (e.g., a selectable code path, etc.), as a visual representation of a selectable link (e.g., a selectable pin, text, icon, image, hyperlink, etc.), and the like.

FIG. 5B illustrates another example visual depiction 525 of at least a portion of the behavioral model. Visual depiction 500 and visual depiction 525 may both be generated from the same behavioral model. For example, when the behavioral model is stored as data, any format for the visual depiction may be used. In the example of visual depiction 525, the behavioral model is depicted as a sequence diagram.

Visual depiction 525 includes functional areas 530 including HTTP server requests 530*a*, actionpak 530*b*, logger 530*c*, activesupport 530*d*, controllers 530*e*, actionview 530*f*, views 530*g*, helpers 530*h*. Visual depiction 525 may include more or fewer functional areas 530 than depicted in this example, and the functional areas 530 may have any appropriate names. Visual depiction 525 further includes the operational paths that are generated when calls are made, including the amount of time to complete the operations. For example, the write from actionpak 530*b* to logger 530*c* took 0.021 ms. Further, loops, including loop 535 are depicted. Other helpful data depicting the behavior of the codebase may be included in visual depiction 525 including, for example, internal calls within a functional area including functional call 540.

Figure 6A:
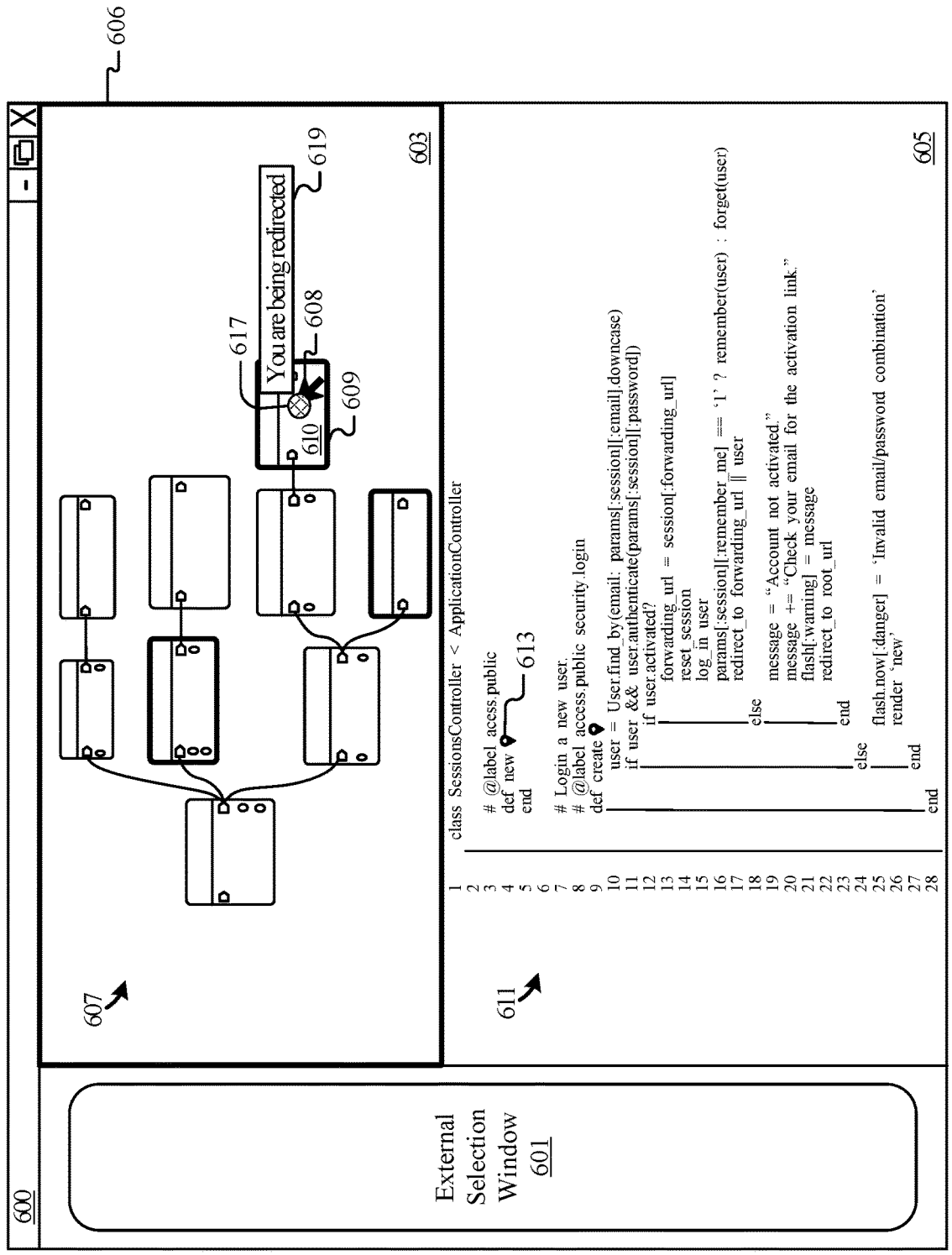
FIG. 6A illustrates a user interface, according to some embodiments.
Figure 6B:
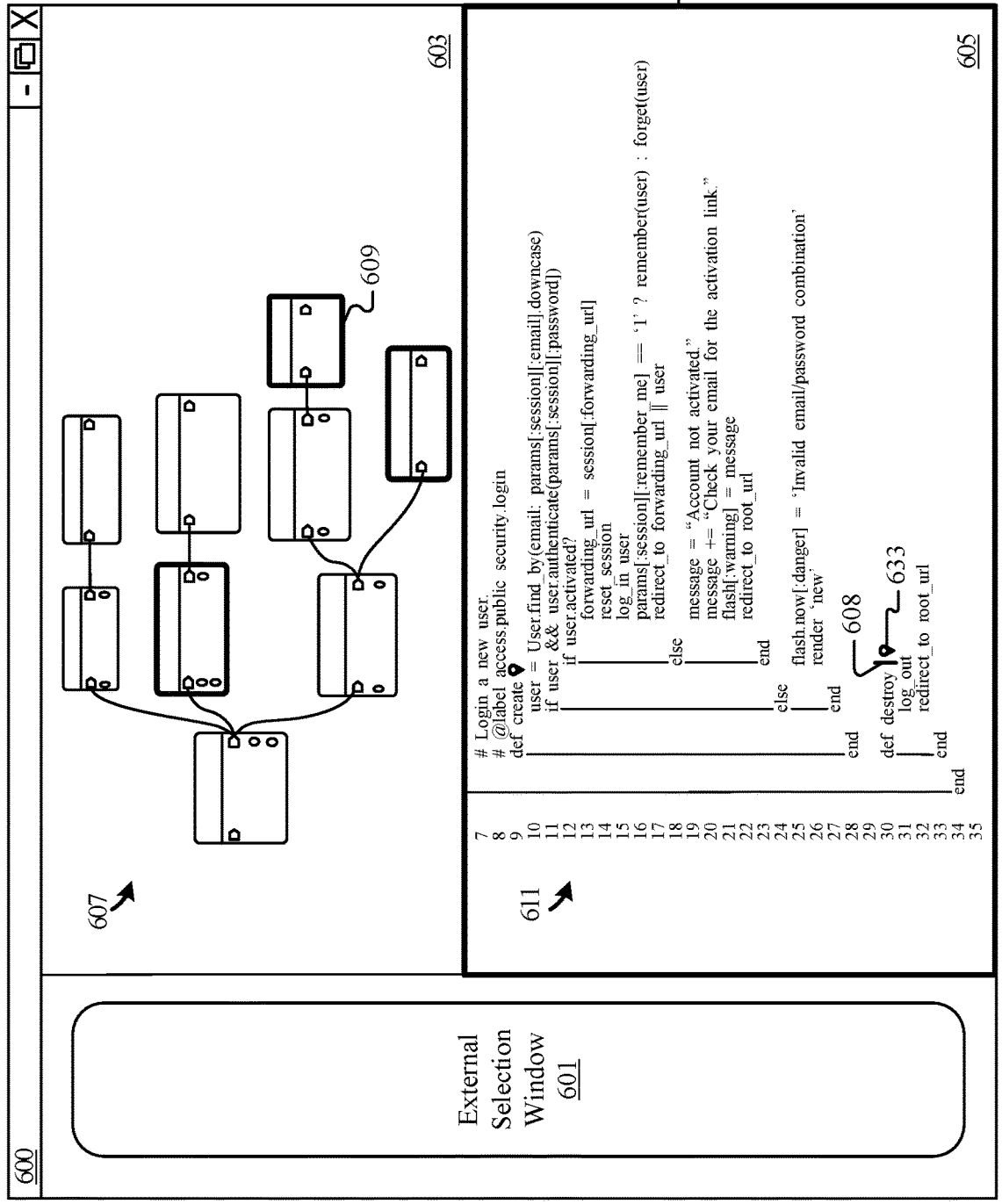
FIG. 6B illustrates a user interface, according to some embodiments.

FIGS. 6A and 6B illustrate example user interface 600 in a brief operational scenario in which a tagging system or application employs interrogation and tagging process 700 of FIG. 7 to shift a focus of user interface 600 based on a selection of a codebase tag. User interface 600 is representative of a graphical user interface (e.g., user interface 331 of FIG. 3) accessed via a computing device such as computing device 200 of FIG. 2 or user equipment 330 of FIG. 3. Interrogation and tagging process 700 is a process employed by a tagging module to interrogate or otherwise probe a codebase and place tags within the codebase as well as a behavioral model of the codebase. The tags may be depicted as user interface elements selectable to identify lines of the codebase that correspond to features of a behavioral model and vice versa. Interrogation and tagging process 700 may be implemented in program instructions in the context of any of the software applications, modules, components, or other such elements disclosed herein. The program instructions, when executed by one or more processors of one or more computing devices, direct the one or more computing devices to operate as described below, referring to a computing device in the singular for the sake of clarity. The following describes an application of interrogation and tagging process 700 with respect to the elements of user interface 600.

In FIG. 6A, user interface 600 includes external selection window 601, first pane 603, second pane 605, and focus 606. User interface 600 provides access to the functions and capabilities of an application, and external selection window 601 displays various menu options for a user to access the functions and capabilities of the application. Examples of menu options may include options to select a codebase to write, edit, debug, or otherwise access; options to generate, interrogate, or otherwise access a behavioral model; etc.

First pane 603 includes a visual depiction of behavioral model 607, cursor 608, and codebase tag 609, which is depicted as a selectable functional block (e.g., block 610). Behavioral model 607 represents the run-time behavior of codebase 611 and includes code paths, functional blocks (e.g., block 610), and details about inputs to and outputs from the functional blocks. Codebase tag 609 was generated and appended to block 610 (e.g., by tagging module 112 or behavioral model interrogation module 115 of FIG. 1). Behavioral model 607 may be representative of the behavioral model depicted in visual depiction 500 of FIG. 5A and visual depiction 525 of FIG. 5B, and codebase tag 609 may be representative of codebase tags 520A-C of FIG. 5A. Focus 606 of user interface 600 is currently on first pane 603, and cursor 608 is located at codebase tag 609.

Second pane 605 includes code lines 1 through 28 of codebase 611 and locational tags (e.g., locational tag 613), which are depicted as selectable pins. Second pane 605 is representative of a code editor capable of writing and editing codebase 611. Codebase 611 may be in any coding language and may use any programming paradigm including structured, procedural, functional, modular, object-oriented, etc. Accordingly, codebase 611 may include objects, structures, procedures, modules, or the like. Codebase 611 represents codebase 400 of FIG. 4. Locational tags pin a location of the locational tag in codebase 611 to a corresponding codebase tag in behavior model 607.

In an implementation, a computing device (not shown) generates a view of codebase 611 (step 701) and displays the view in second pane 605. To generate the view of the codebase, the computing device may employ a tagging module to place a plurality of locational tags (e.g., locational tag 613) throughout codebase 611. For example, the tagging module may place locational tag 613 at code line 4 responsive to identifying code line 4 as the start of a function, as the start of a step associated with an identified error and/or complication, as the exact location of an identified error and/or complication, as corresponding to a codebase tag of behavioral model 607 (e.g., codebase tag 609), and the like.

The computing device also generates behavior model 607 (step 703). To generate behavioral model 607, the computing device interrogates a recording of an execution of codebase 611. The recording may include trace files and/or other diagnostic logs and may be accessed by the computing device from storage media local to the computing device or from a source remote to the computing device. The computing device may then place locational tags at corresponding locations throughout codebase 611 and/or append codebase tags to corresponding locations within behavioral model 607. In some embodiments, the computing device interrogates behavioral model 607 to identify complications by, for example, comparing behavioral model 607 to a predefined set of problem patterns. These problem patterns identify both static and dynamic complications related to security, production, and the like. The computing device identifies a run-time complication, for example, when the computing device identifies a problem pattern within behavioral model 607. In the same of other embodiment, an AI model is used to interrogate the behavioral model and identify locations to place the tags.

The computing device then generates a visual depiction of behavior model 607 (step 705) and displays the visual depiction in first pane 603. The visual depiction of behavior model 607 includes functional blocks that represent a step executed during the run of codebase 611, code paths that connect at least two functional blocks based on the run of codebase 611, and codebase tags (e.g., codebase tag 609) that pin a location of the codebase tag in behavior model 607 to a corresponding locational tag in codebase 611 (e.g., locational tag 613). The codebase tags may have been appended to the functional blocks responsive to an interrogation module identifying a complication in the run-time behavior of the codebase, responsive to detecting a corresponding locational tag in the codebase, for another reason indicated by a tagging model, and the like.

The computing device provides user interface 600 (step 707) and receives, via user interface 600, user input 617 selecting codebase tag 609. User input 617 may include a mouse click, a touch gesture, a stylus gesture, a voice command, a keystroke, etc. Responsive to user input 617, the computing device may generate and surface message 619. Message 619 indicates that a focus of user interface 600 (e.g., focus 606) is being redirected to another portion of user interface 600 (e.g., "you are being redirected"). Message 619 may be presented as a pop-up window, as a new pane, as floating text, etc. Message 619 may be presented alongside and/or proximate to the location of user input 617, a boundary of first pane 603, a boundary of second pane 605, a location of a tag, a line of code, etc. Alternatively, the computing device may change the focus of user interface 600 without generating or displaying message 619.

FIG. 6B illustrates user interface 600 of FIG. 6A and includes external selection window 601, first pane 603, second pane 605, and focus 631. Responsive to receiving user input 617 of FIG. 6A, the computing device shifts the focus of user interface from first pane 603 to second pane 605, as indicated by focus 631 (step 709). Also, responsive to receiving user input 617, the computing device relocates cursor 608 from codebase tag 609 to corresponding locational tag 633 at code line 30 of codebase 611 (step 711) and adjusts the visible portion of the view of codebase 611 to include corresponding locational tag 633 (step 713).

The computing device may receive another user input (not shown) via user interface 600 that indicates a modification to codebase 611. The user input may include a mouse click, a touch gesture, a stylus gesture, a voice command, a keystroke, etc. Responsive to the user input, the computing device may update codebase 611. The computing device may also store the updated codebase.

Figure 8A:
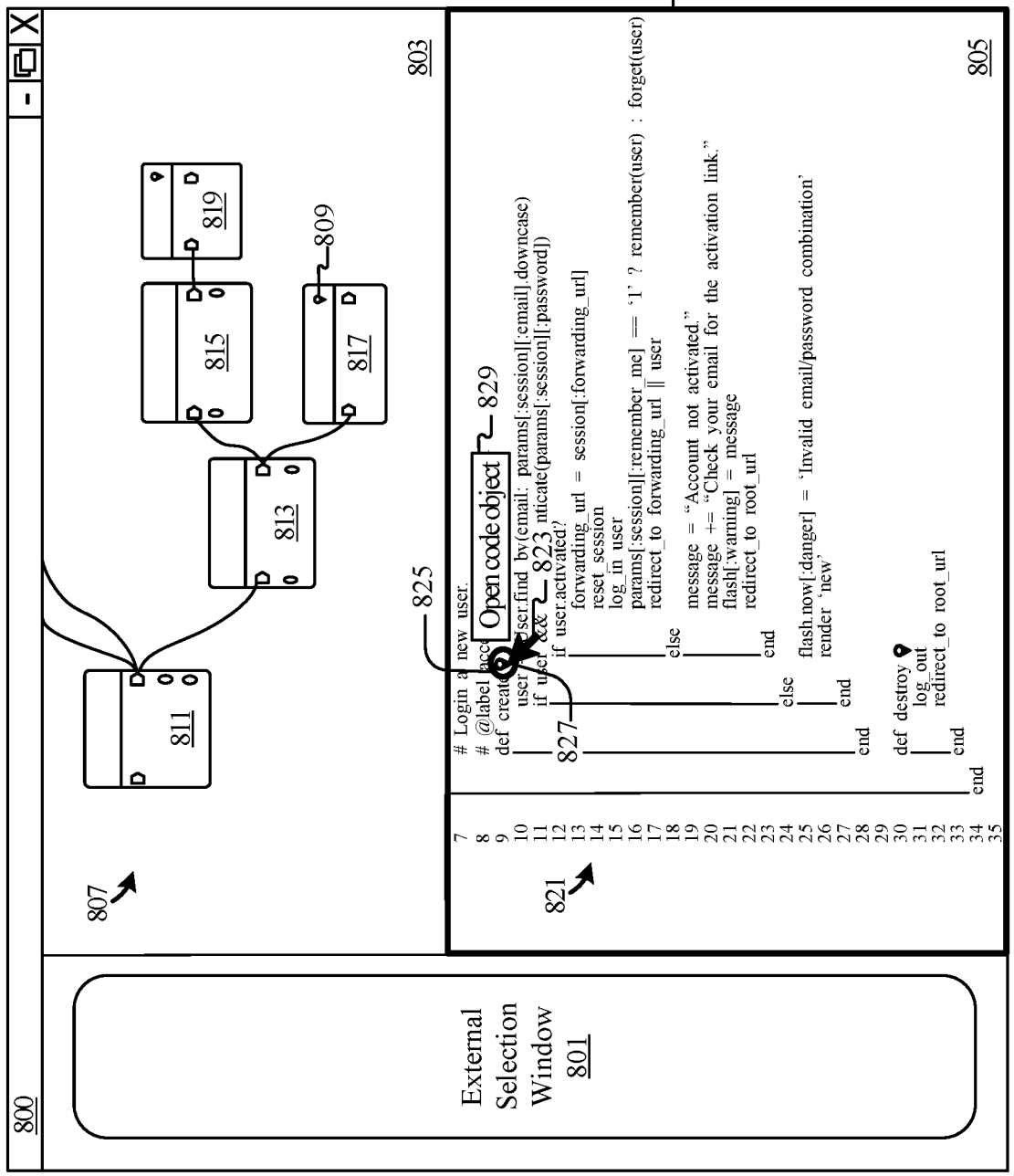
FIG. 8A illustrates a user interface, according to some embodiments.
Figure 8B:
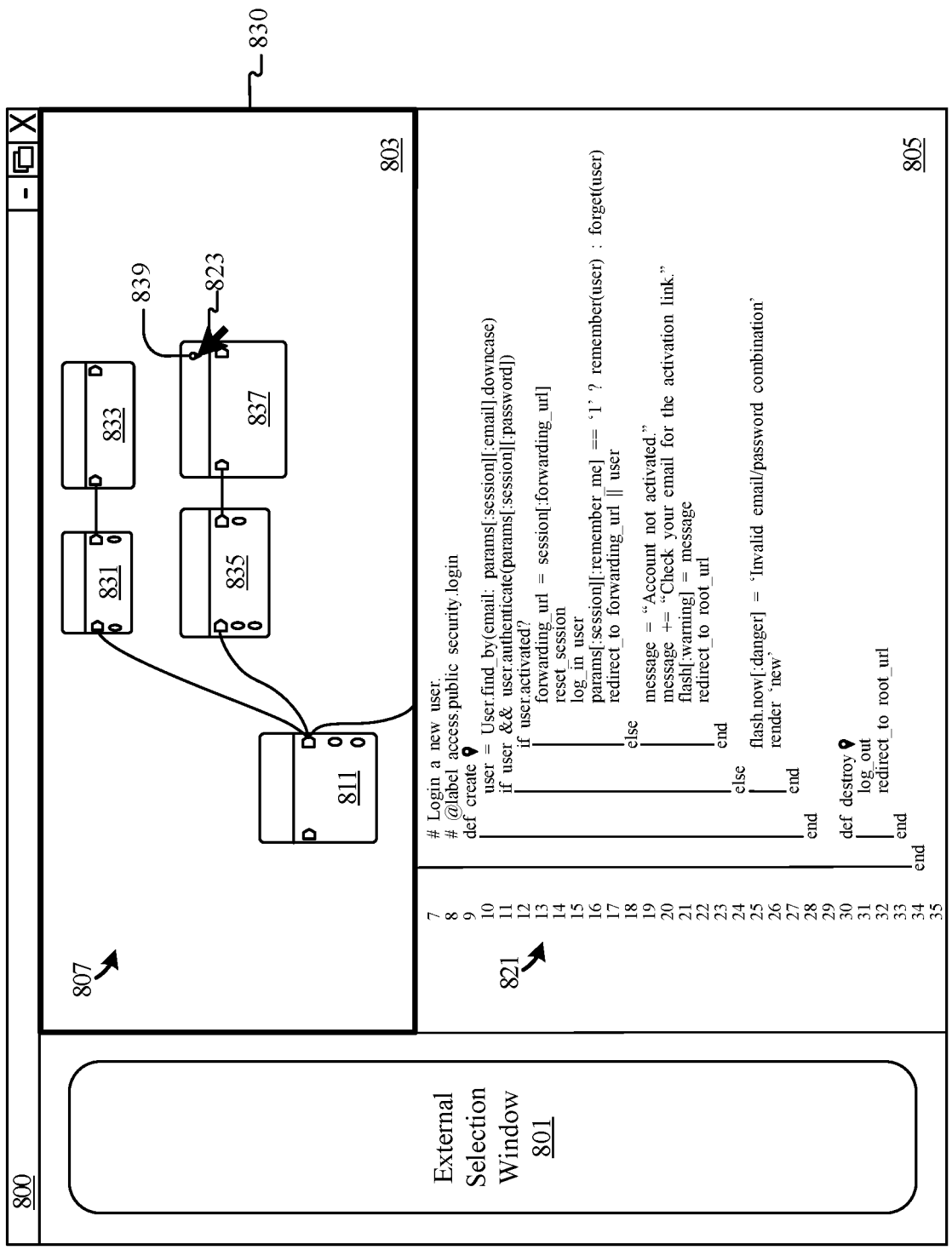
FIG. 8B illustrates a user interface, according to some embodiments.

FIGS. 8A and 8B illustrate example user interface 800 in a brief operational scenario in which a tagging module employs an interrogation and tagging process to shift a focus of user interface 800 based on a selection of a locational tag. User interface 800 is representative of a graphical user interface (e.g., user interface 331 of FIG. 3) accessed via a computing device such as computing device 200 of FIG. 2 or user equipment 330 of FIG. 3. The following describes an application of the interrogation and tagging process with respect to the elements of user interface 800.

In FIG. 8A, user interface 800 includes external selection window 801, first pane 803, second pane 805, and focus 806. User interface 800 provides access to the functions and capabilities of an application, and external selection window 801 displays various menu options for a user to access the functions and capabilities of the application. Examples of the menu options may include options to select a codebase to write, edit, debug, or otherwise access; options to generate, interrogate, or otherwise access a behavioral model; etc.

First pane 803 includes a visual depiction of behavioral model 807 and codebase tag 809, which is depicted as a selectable pin. Behavioral model 807 represents the run-time behavior of codebase 821 and includes code paths, functional blocks 811-819, and details about inputs to and outputs from the functional blocks. Codebase tag 809 was generated and appended to block 817 (e.g., by tagging module 112 or behavioral model interrogation module 115 of FIG. 1). Behavioral model 807 may be representative of the behavioral model depicted in visual depiction 500 of FIG. 5A and visual depiction 525 of FIG. 5B, and codebase tag 809 may be representative of codebase tags 520A-C of FIG. 5A.

Second pane 805 includes code lines 7 through 35 of codebase 821, cursor 823, and locational tags (e.g., locational tag 825), which are depicted as selectable pins. Second pane 805 is representative of a code editor capable of writing and editing codebase 821. Codebase 821 may be in any coding language and may use any programming paradigm including structured, procedural, functional, modular, object-oriented, etc. Accordingly, codebase 821 may include objects, structures, procedures, modules, or the like. Codebase 821 represents codebase 400 of FIG. 4. Locational tags pin a location of the locational tag in codebase 821 to a corresponding codebase tag in behavior model 807. Focus 806 of user interface 800 is currently on second pane 805, and cursor 823 is located at locational tag 825.

In an implementation, a computing device (not shown) generates a view of codebase 821 and displays the view in second pane 805. To generate the view of the codebase, the computing device may employ a tagging module to place a plurality of locational tags (e.g., locational tag 825) throughout codebase 821. For example, the tagging module may place locational tag 825 at code line 9 responsive to identifying code line 9 as the start of a function, as the start of a step associated with an identified error and/or complication, as the exact location of an identified error and/or complication, as corresponding to a codebase tag of behavioral model 807 (e.g., codebase tag 839), and the like.

The computing device also generates behavior model 807. To generate behavioral model 807, the computing device interrogates a recording of an execution of codebase 821. The recording may include trace files and/or other diagnostic logs and may be accessed by the computing device from storage media local to the computing device or from a source remote to the computing device. The computing device may then place locational tags at corresponding locations throughout codebase 821 and/or append codebase tags to corresponding locations within behavioral model 807. In some embodiments, the computing device interrogates behavioral model 807 to identify complications by, for example, comparing behavioral model 807 to a predefined set of problem patterns. These problem patterns identify both static and dynamic complications related to security, production, and the like. The computing device identifies a run-time complication, for example, when the computing device identifies a problem pattern within behavioral model 807. In the same or other embodiment, an AI model is used to interrogate the behavioral model and identify locations to place tags.

The computing device then generates a visual depiction of behavior model 807 and displays the visual depiction in first pane 803. The visual depiction of behavior model 807 includes functional blocks that represent a step executed during the run of codebase 821, code paths that connect at least two functional blocks based on the run of codebase 821, and codebase tags (e.g., codebase tag 809) that pin a location of the codebase tag in behavior model 807 to a corresponding locational tag in codebase 821. The codebase tags may have been appended to the functional blocks responsive to an interrogation module identifying a complication in the run-time behavior of the codebase, responsive to detecting a corresponding locational tag in the codebase, for another reason indicated by a tagging model, and the like.

The computing device provides user interface 800 and receives, via user interface 800, user input 827 selecting locational tag 825. User input 827 may include a mouse click, a touch gesture, a stylus gesture, a voice command, etc. Responsive to user input 827, the computing device may generate and surface message 829. Message 829 indicates that a focus of user interface 800 (e.g., focus 806) is being redirected to another portion of user interface 800 (e.g., to the code object generated based on the codebase associated with locational tag 825). Message 829 may be presented as a pop-up window, as a new pane, as floating text, etc. Message 829 may be presented alongside and/or proximate to the location of user input 827, a boundary of first pane 803, a boundary of second pane 805, a location of a tag, a line of code, etc. Alternatively, the computing device may change the focus of user interface 800 without generating or displaying message 819.

FIG. 8B illustrates user interface 800 of FIG. 8A and includes external selection window 801, first pane 803, second pane 805, and focus 830. Responsive to receiving user input 827 of FIG. 8A, the computing device shifts the focus of user interface 800 from second pane 805 to first pane 803, as indicated by focus 830. Also, responsive to receiving user input 827, the computing device relocates cursor 823 from locational tag 825 to corresponding codebase tag 839 at functional block 837 and adjusts the visible portion of the visual depiction of behavior model 807 to include corresponding codebase tag 839 as well as functional blocks 811 and 831-837.

FIG. 9 illustrates computing device 901 that is representative of any system or collection of systems in which the various processes, programs, services, and scenarios disclosed herein may be implemented. Examples of computing device 901 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof. Computing device 901 may be device 200, user equipment 330, computing devices that implement cloud services including behavioral model generation module 310, tagging module 340, behavioral model interrogation module 315, codebase interrogation module 320, interface 305, and storage 325, a computing device that implements user interfaces 600 and 800, and a computing device that implements process 700.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements interrogation and tagging process 906, which includes interrogation and tagging process 700, the behavioral model generation (e.g., generation module 110, behavioral model generation module 223, 310) based on a codebase (e.g., codebase 105, 211, 400), the behavioral model interrogation (e.g., tagging module 112, behavioral model interrogation module 115, codebase interrogation module 120, tagging module 224, behavioral model interrogation module 225, behavioral model interrogation module 315, tagging module 340, codebase interrogation module 227, codebase interrogation module 320) to generate tags and position tags within the behavioral model and codebase. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise any type of processor (e.g., a micro-processor) and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, repositories, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In other words, the computer readable storage media is a non-transitory computer readable media.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or other systems.

Software 905 (including interrogation and tagging process 906) may be implemented in program instructions and among other functions may, when executed by processing system 902, direct processing system 902 to operate as described with respect to the various operational scenarios, sequences, and processes illustrated herein. For example, software 905 may include program instructions for implementing a codebase interrogation and tagging process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional methods, processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to support the described runtime analysis of a codebase to generate a behavioral model and tagging functionality to correlate the generated behavioral model with the corresponding locations in the codebase. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method, comprising:
generating a view of codebase, wherein generating the view of the codebase comprises placing a plurality of locational tags throughout the codebase;
generating a behavior model of a run by interrogating a recording of an execution of the codebase, wherein the behavior model represents a run-time behavior of the codebase;
generating a visual depiction of the behavior model comprising:
a plurality of functional blocks, each functional block representing a step executed during the run,
a plurality of code paths, each code path connecting at least two functional blocks based on the run, and
a plurality of codebase tags, wherein each codebase tag pins a location of the codebase tag in the behavior model to a corresponding locational tag of the plurality of locational tags in the codebase;
providing a user interface (UI) comprising a first pane and a second pane, the first pane comprising the visual depiction of the behavior model, and the second pane comprising the view of the codebase; and in response to receiving a selection of a first codebase tag of the codebase tags in the behavior model:
shifting a focus of the UI from the first pane to the second pane,
relocating a cursor from the first codebase tag to the corresponding locational tag in the codebase, and
adjusting a visible portion of the view of the codebase to include the corresponding locational tag.

2. The method of claim 1, further comprising:
in response to receiving a selection of a first locational tag of the plurality of locational tags in the codebase:
shifting the focus of the UI from the second pane to the first pane;
relocating the cursor from the first locational tag to the corresponding codebase tag in the behavior model; and
adjusting a visible portion of the visual depiction of the behavior model to include the corresponding codebase tag.

3. The method of claim 1, wherein the codebase is stored in a repository, the method further comprising:
receiving, via the view of the codebase, an input that modifies the codebase; and
updating the codebase stored in the repository based on the input.

4. The method of claim 1, further comprising:
executing the codebase in a test environment; and
recording the executing to generate the recording of the execution of the codebase.

5. The method of claim 1, further comprising:
executing the codebase in a production environment; and
recording the executing to generate the recording of the execution of the codebase.

6. The method of claim 1, further comprising:
interrogating the behavior model to identify possible performance issues in the codebase based on the run-time behavior;
positioning one or more of the plurality of locational tags in the view of the codebase based on locations of the possible performance issues in the codebase; and
positioning one or more corresponding codebase tags in the behavior model.

7. The method of claim 1, further comprising:
interrogating the behavior model to identify possible performance issues in the codebase based on the run-time behavior;
positioning one or more of the plurality of codebase tags in the behavior model based on locations of the possible performance issues in the codebase; and
positioning one or more corresponding locational tags in the codebase.

8. The method of claim 1, further comprising positioning a codebase tag of the plurality of codebase tags in each functional block of the plurality of functional blocks.

9. A computing system, comprising:
one or more processors; and
a memory having stored thereon instructions that, upon execution by the one or more processors, cause the one or more processors to:
generate a view of codebase, wherein generating the view of the codebase comprises placing a plurality of locational tags throughout the codebase;
generate a behavior model of a run by interrogating a recording of an execution of the codebase, wherein the behavior model represents a run-time behavior of the codebase;
generate a visual depiction of the behavior model comprising:
a plurality of functional blocks, each functional block representing a step executed during the run,
a plurality of code paths, each code path connecting at least two functional blocks based on the run, and
a plurality of codebase tags, wherein each codebase tag pins a location of the codebase tag in the behavior model to a corresponding locational tag of the plurality of locational tags in the codebase;
provide a user interface (UI) comprising a first pane and a second pane, the first pane comprising the visual depiction of the behavior model, and the second pane comprising the view of the codebase; and
in response to receiving a selection of a first codebase tag of the codebase tags in the behavior model:
shift a focus of the UI from the first pane to the second pane,
relocate a cursor from the first codebase tag to the corresponding locational tag in the codebase, and
adjust a visible portion of the view of the codebase to include the corresponding locational tag.

10. The computing system of claim 9, wherein the instructions comprise further instructions that, upon execution by the one or more processors, cause the one or more processors to:
in response to receiving selection of a first locational tag of the plurality of locational tags in the codebase:
shift the focus of the UI from the second pane to the first pane;
relocate the cursor from the first locational tag to the corresponding codebase tag in the behavior model; and
adjust a visible portion of the visual depiction of the behavior model to include the corresponding codebase tag.

11. The computing system of claim 9, further comprising:
a repository storing the codebase,
wherein the instructions comprise further instructions that, upon execution by the one or more processors, cause the one or more processors to:
receive, via the view of the codebase, input that modifies the codebase; and
update the codebase stored in the repository based on the input.

12. The computing system of claim 9, wherein the instructions comprise further instructions that, upon execution by the one or more processors, cause the one or more processors to:
execute the codebase in a test environment; and
record the executing to generate the recording of the execution of the codebase.

13. The computing system of claim 9, wherein the instructions comprise further instructions that, upon execution by the one or more processors, cause the one or more processors to:
execute the codebase in a production environment; and
record the executing to generate the recording of the execution of the codebase.

14. The computing system of claim 9, wherein the instructions comprise further instructions that, upon execution by the one or more processors, cause the one or more processors to:
- interrogate the behavior model to identify possible performance issues in the codebase based on the run-time behavior;
- position one or more of the plurality of locational tags in the view of the codebase based on locations of the possible performance issues in the codebase; and
- position one or more corresponding codebase tags in the behavior model.

15. The computing system of claim 9, wherein the instructions comprise further instructions that, upon execution by the one or more processors, cause the one or more processors to:
- interrogate the behavior model to identify possible performance issues in the codebase based on the run-time behavior;
- position one or more of the plurality of codebase tags in the behavior model based on locations of the possible performance issues in the codebase; and
- position one or more corresponding locational tags in the codebase.

16. The computing system of claim 9, wherein the instructions comprise further instructions that, upon execution by the one or more processors, cause the one or more processors to position a codebase tag of the plurality of codebase tags in each functional block of the plurality of functional blocks.

17. A non-transitory computer readable media comprising instructions that, upon execution by one or more processors, cause the one or more processors to:
- processors, cause the one or more processors to:
- generate a view of codebase, wherein generating the view comprises placing a plurality of locational tags throughout the codebase;
- generate a behavior model of a run by interrogate a recording of an execution of the codebase, wherein the behavior model represents a run-time behavior of the codebase;
- generate a visual depiction of the behavior model comprising:
  - a plurality of functional blocks, each functional block representing a step executed during the run,
  - a plurality of code paths, each code path connecting at least two functional blocks based on the run, and
  - a plurality of codebase tags, wherein each codebase tag pins a location of the codebase tag in the behavior model to a corresponding locational tag of the plurality of locational tags in the codebase;
- provide a user interface (UI) comprising a first pane and a second pane, the first pane comprising the visual depiction of the behavior model, and the second pane comprising the view of the codebase; and
- in response to receiving a selection of a first codebase tag of the codebase tags in the behavior model:
- shift a focus of the UI from the first pane to the second pane, relocate a cursor from the first codebase tag to the corresponding locational tag in the codebase, and
- adjust a visible portion of the view of the codebase to include the corresponding locational tag.

18. The computer readable media of claim 17, wherein the instructions comprise further instructions that, upon execution by the one or more processors, cause the one or more processors to:
- in response to receiving selection of a first locational tag of the plurality of locational tags in the codebase:
  - shift the focus of the UI from the second pane to the first pane;
  - relocate the cursor from the first locational tag to the corresponding codebase tag in the behavior model; and
  - adjust a visible portion of the view of the visual depiction of the behavior model to include the corresponding codebase tag.

19. The computer readable media of claim 17, further comprising:
- a repository storing the codebase,
- wherein the instructions comprise further instructions that, upon execution by the one or more processors, cause the one or more processors to:
  - receive, via the view of the codebase, input that modifies the codebase; and
  - update the codebase stored in the repository based on the input.

20. The computer readable media of claim 17, wherein the instructions comprise further instructions that, upon execution by the one or more processors, cause the one or more processors to:
- interrogate the behavior model to identify possible performance issues in the codebase based on the run-time behavior;
- position one or more of the plurality of locational tags in the view of the codebase based on locations of the possible performance issues in the codebase; and
- position one or more corresponding codebase tags in the behavior model.

* * * * *